United States Patent [19]
Crowley et al.

[11] Patent Number: 5,692,999
[45] Date of Patent: Dec. 2, 1997

[54] METHOD AND APPARATUS FOR BUSINESS FORMS PROCESSING

[75] Inventors: H. W. Crowley, Newton; John W. Clifford, Ashland; Peter Bianchetto, Foxboro, all of Mass.

[73] Assignee: Roll Systems, Inc., Burlington, Mass.

[21] Appl. No.: 235,506

[22] Filed: Apr. 29, 1994

Related U.S. Application Data

[60] Continuation-in-part of Ser. No. 172,545, Dec. 23, 1993, Pat. No. 5,399,143, which is a division of Ser. No. 832,097, Feb. 6, 1992, Pat. No. 5,273,516.

[51] Int. Cl.$^6$ ............................................. B65H 29/00
[52] U.S. Cl. .................. 493/416; 414/789.2; 414/373; 414/790.5; 211/49.1; 211/59.2; 108/1
[58] Field of Search .......................... 493/405–416, 493/357–360, 436; 414/789.2, 789.3, 789.4, 789.8, 790.4, 790.6, 790.5, 373; 271/149, 151–153; 108/1, 6, 12, 13; 211/49.1, 50–53, 59.2

[56] References Cited

U.S. PATENT DOCUMENTS

| | | |
|---|---|---|
| 3,741,413 | 6/1973 | Friel . |
| 3,851,773 | 12/1974 | Kluge et al. . |
| 3,883,131 | 5/1975 | Anderson, Jr. et al. . |
| 3,887,088 | 6/1975 | Fernandez-Rana et al. . |
| 3,902,711 | 9/1975 | Lenoir . |
| 3,974,921 | 8/1976 | Tokuno . |
| 4,103,786 | 8/1978 | Tokuno . |
| 4,197,045 | 4/1980 | Stauber . |
| 4,302,025 | 11/1981 | Waddell et al. . |
| 4,372,201 | 2/1983 | Dudziak . |
| 4,429,889 | 2/1984 | Westra . |
| 4,728,245 | 3/1988 | Shelton ................. 280/47.2 |
| 4,886,410 | 12/1989 | Lisec . |
| 5,061,233 | 10/1991 | Schultz et al. . |
| 5,120,183 | 6/1992 | Phillips . |
| 5,149,125 | 9/1992 | Gray . |
| 5,234,306 | 8/1993 | Yamashita . |
| 5,263,701 | 11/1993 | Kleinhen et al. . |
| 5,273,516 | 12/1993 | Crowley . |
| 5,279,536 | 1/1994 | Abreu . |
| 5,320,475 | 6/1994 | Pinder . |
| 5,322,496 | 6/1994 | Ernst et al. . |
| 5,413,449 | 5/1995 | Schoenherr et al. . |

FOREIGN PATENT DOCUMENTS

A-2189198  10/1987  United Kingdom .

OTHER PUBLICATIONS

"AutoLoad™ Forms Transfer System"–Product Description Sheet Distibuted to Customers, Rev. Aug. 1992.
"MiniRack™"–Product Description Sheet Distributed to Customers, Rev. Aug. 1992.
"AutoLoad™ Forms Transfer Table"–product Description Sheet Distributed to Customers, Rev. Oct. 1992.
"MiniRack™"–Product Description Sheet Distributed to Customers, Rev. Nov. 1992.
"Forms Transfer System"–Product Description Sheet Distributed to Customers, Rev. Dec. 1993.
Wallace Computer Services, Inc., "Printed Forms Transport" sales flyer, Oct. 1992.
Wallace Computer Services, Inc., "LaserMax System: Moveable Conveyor Cart" sales flyer.

*Primary Examiner*—Jack W. Lavinder
*Attorney, Agent, or Firm*—Cesari and McKenna, LLP

[57] ABSTRACT

A system for stacking continuous folded forms or web coming from a folder and separator and moving to a conveyor. A table is positioned adjacent and in line with the conveyor and in a position for receiving a horizontally-extending stack of folded forms disposed on the table top. The table is a tiltable table and is able to be tilted from a substantially-horizontal position to a substantially-vertical position to likewise move the stack from a horizontal to a vertical stack position. A cart is movable to a position adjacent to the tilted table for receiving from the table the vertical stack for support on the cart. The cart can include a plurality of storage locations that can each be provided with a stack.

33 Claims, 21 Drawing Sheets

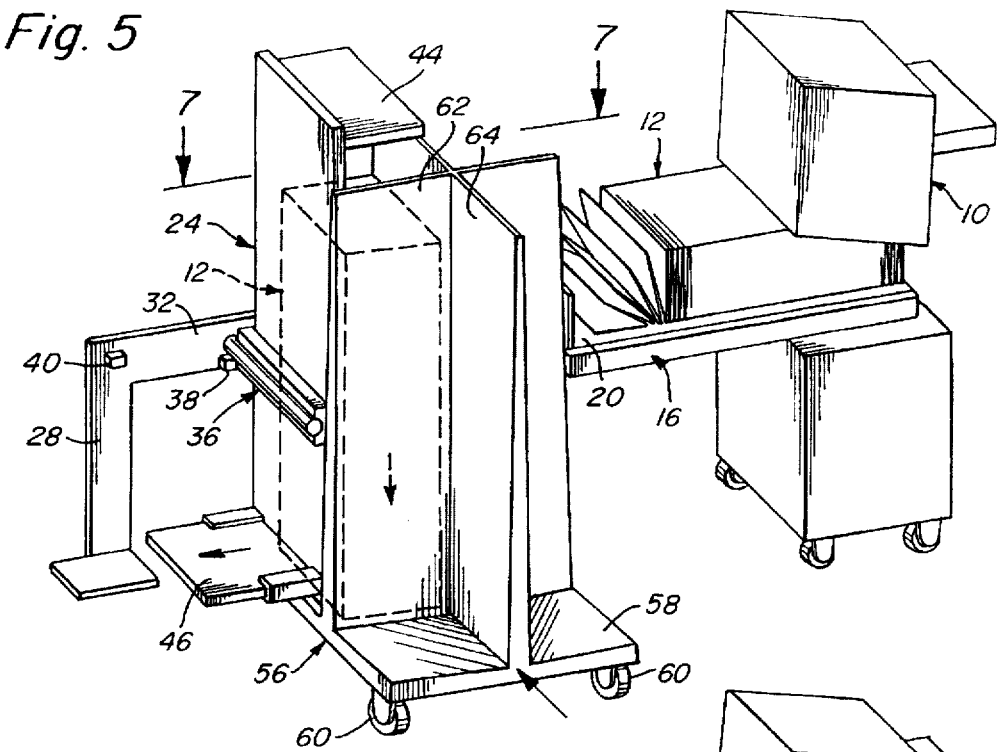
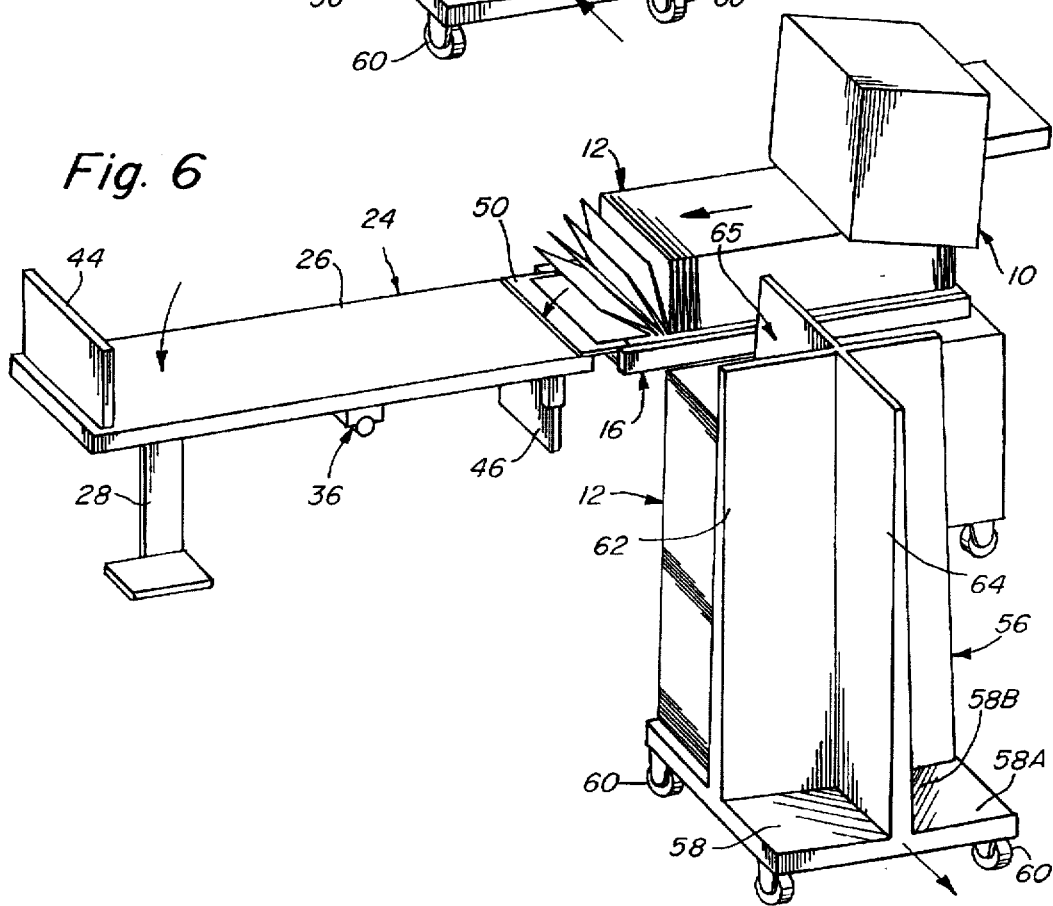

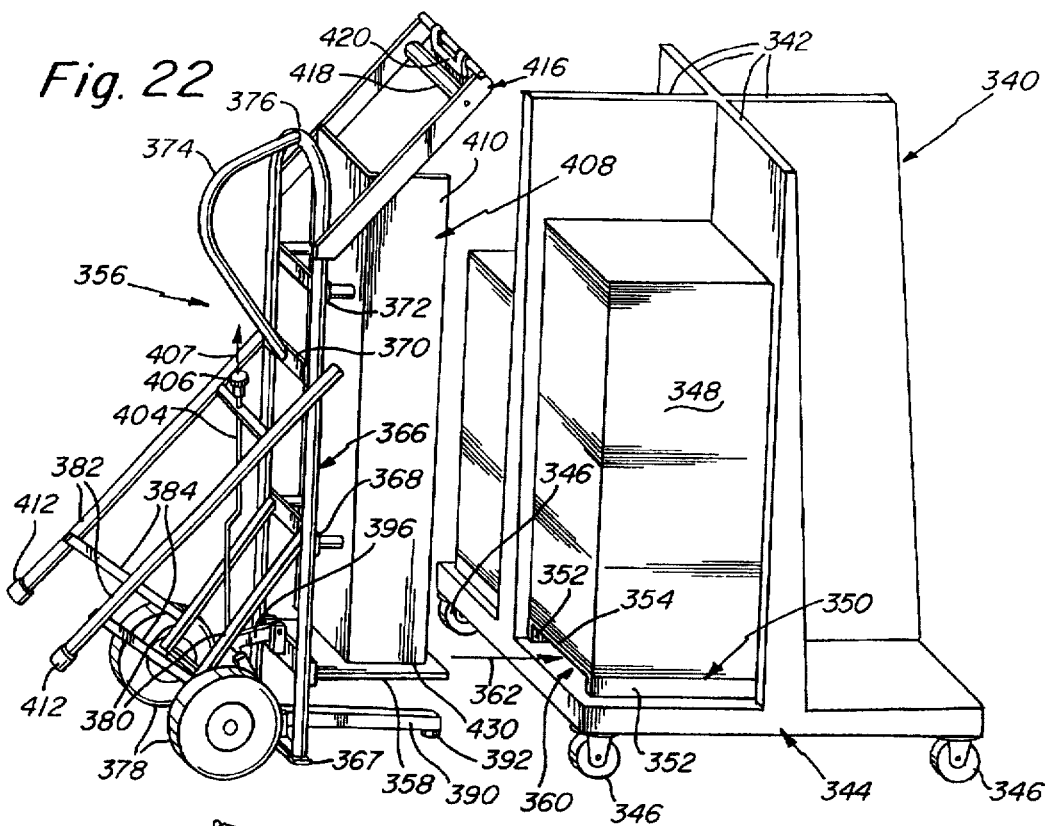
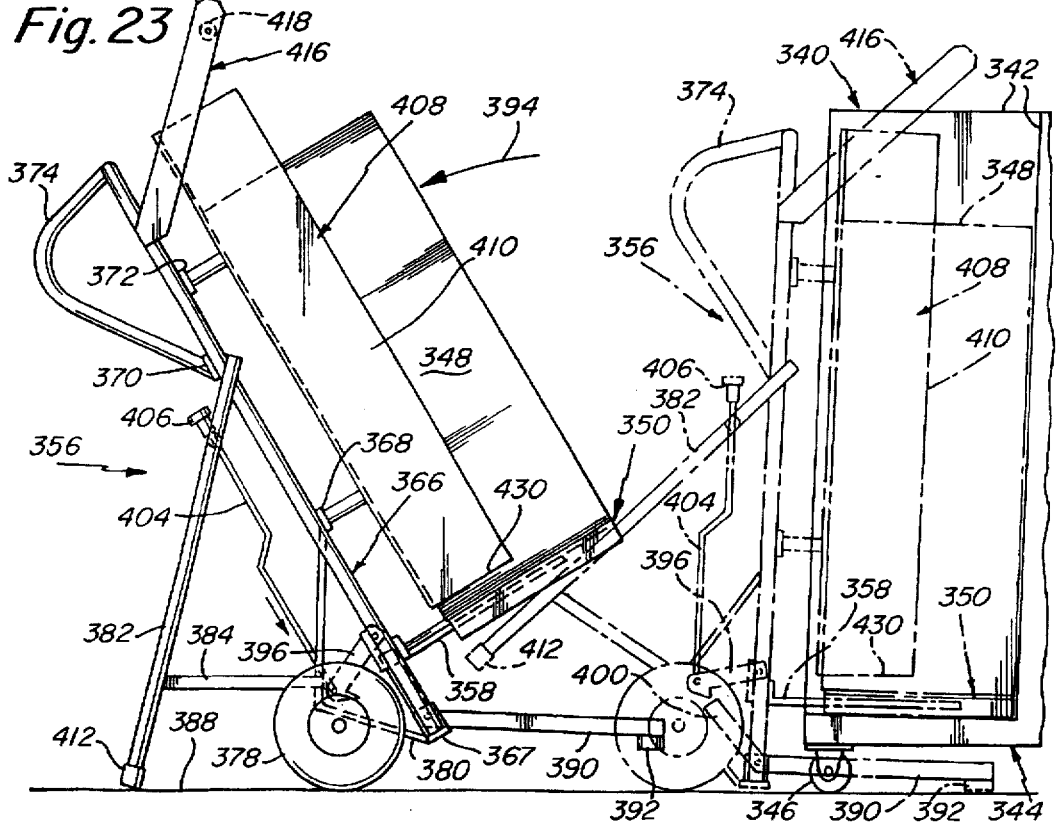

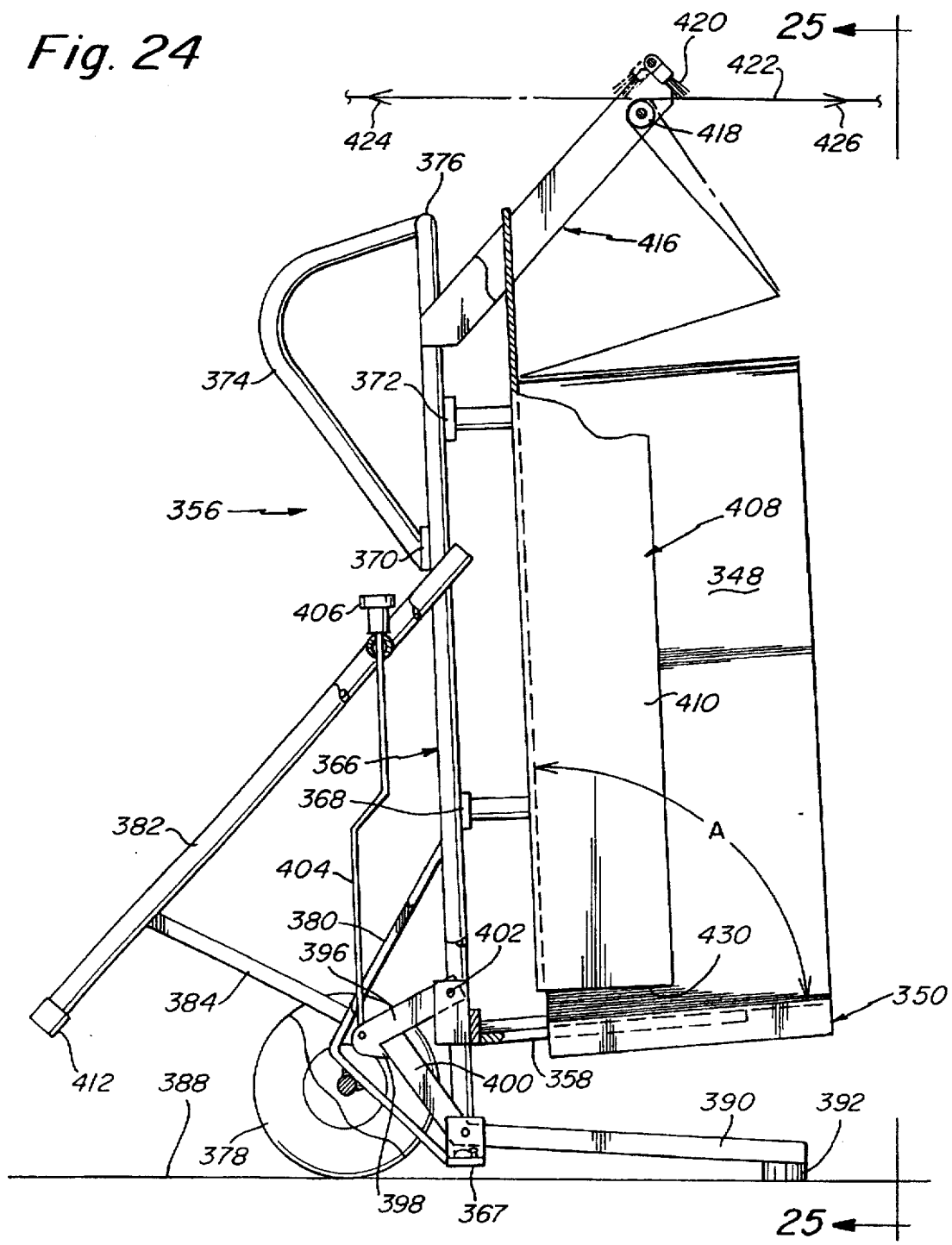

METHOD AND APPARATUS FOR BUSINESS FORMS PROCESSING

RELATED APPLICATIONS

This application is a continuation-in-part of U.S. patent application Ser. No. 08/172,545 filed on Dec. 23, 1993, now U.S. Pat. No. 5,399,143, which is a divisional application of U.S. patent application Ser. No. 07/832,097, filed on Feb. 6, 1992, now U.S. Pat. No. 5,273,516, issued Dec. 28, 1993.

FIELD OF THE INVENTION

The present invention relates in general to a method and apparatus for the processing of business forms or web. More particularly, the present invention relates to a system for stacking continuous folded forms. Even more particularly, the present invention relates to a unique combination of elements used in such a system employing a tiltable table in combination with a cart or rack that supports a stack of sheet or folded material.

BACKGROUND OF THE INVENTION

There are various ways of processing folded forms particularly between an initial folding operation and subsequent finish operations. However, existing transfer systems tend to be rather complex in construction and have rather limited capacity.

It is an object of the present invention to provide a forms transfer system that has an improved capacity and in particular in which a transfer rack is used having a capacity of 50,000 forms or more.

Another object of the present invention is to provide an improved system for stacking continuous folded forms in which there is far less frequent intervention by an operator. In accordance with the present invention there is a minimizing of handling of the forms, thus minimizing maintenance problems associated with the system.

Still another object of the present invention is to provide a cart system in which the cart is far more space-efficient than prior carts. In accordance with the present invention, for a particular square footage of coverage of the cart, there is a forms capacity far in excess of that previously obtainable.

Another object of the present invention is to provide an improved system for stacking continuous folded forms and associated improved stack rack or stack cart that is relatively inexpensive, of relatively simple construction and one requiring minimal maintenance.

Still another object of the present invention is to provide an improved storage cart for folded forms and one in which it is readily adapted for use with utilization equipment such as feed inserting equipment. This cart should be portable by a variety of methods and devices.

SUMMARY OF THE INVENTION

To accomplish the foregoing and other objects, features, and advantages of the invention there is provided in accordance with the present invention a system for stacking continuous folded forms or sheets. The system of the present invention is characterized by simplicity, versatility, flexibility, cost, cost effectiveness, and space efficiency. The system employs a unique combination of elements that enables folded forms to be conveyed, accepted on a tiltable table and then readily transferred to a stack rack or stack cart.

In accordance with the present invention the system may be considered as comprising a folder for folding the forms along fold lines and a separator for separating the forms at various locations therealong, a conveyor and means for positioning the conveyor adjacent the folder so that the folded forms from the folder are received on and moved along the conveyor. A table is provided having a table top support surface. The table is positioned adjacent and in line with the conveyor and in a position for receiving a horizontal stack of folded forms that are moved by the conveyor and positioned on the table top support surface. In accordance with the embodiment disclosed herein, a flap may bridge between the conveyor and the table which flap is maintained flush with the top surfaces of the conveyor and the table so that the forms pass readily from the conveyor onto the table.

The system of the present invention also provides means for enabling tilting of the table from a substantially horizontal position to a substantially vertical position to in turn move the stack from a horizontally disposed stack to a vertically disposed stack. In the embodiment disclosed herein, associated with the table is a end wall at the end of the table remote from the conveyor and a door or backing support at the end of the table adjacent to the conveyor. The door or backing support, when the table is in a horizontal position may be disposed depending downwardly but may be moved to an upward position to in essence form an opposite end wall for retaining a stack of folded forms on the table between these end walls. The doors, once the stack is moved to a vertical position functions as resting surface for the stack.

Moreover, in accordance with the system of the present invention there is provided a rack or a cart for holding a stack of folded material. This is movable such as by means of wheels or casters on it and is compartmentalized so as to receive preferably a plurality of these vertical stacks. For this purpose the stack cart is movable to a position adjacent the tilted table, once tilted, for receiving from the table the vertical stack for support on the cart.

In the embodiment of the invention disclosed herein, the cart has a bottom resting surface or base and vertically disposed walls preferably defining four separate compartments for accommodating vertical stacks. Each of these compartments may also be provided with one or more shelves so as to accommodate stacks of different height. As also indicated previously, the cart is readily rotatable so that once one stack has been loaded the cart can be easily rotated to receive a further stack from the table once the table receives the stack and is tilted.

According to an alternate embodiment, the tilting table structure according to this invention can include a base that is either fixed to the floor or wheeled for portability, and a bracket assembly that enables the table top to tilt in either a clockwise or counterclockwise direction, allowing unloading of stacks from the table top adjacent either an upstream or downstream side of the base. Additionally, the base can be constructed so that the table can rotate on an axis taken perpendicularly to the floor so that either end (upstream or downstream) of the table can be selectively positioned adjacent a conveyor. Similarly, when the table is disposed (tilted) in a substantially-vertical orientation, the tilted table can be pivoted about the above-described perpendicular axis so that the stack thereon faces in any direction to aid in loading of a multiple-section cart.

The table structure according to an alternate embodiment can further include a plurality of movable backing surfaces or doors that can each be relocated into and out of a path of travel of the web over the table top. These backing surfaces can comprise sliding doors that pass through a slot in the table top. The movable backing surfaces can be located at each of an upstream and downstream location on the table and can enable a stack to be supported at either an upstream or a downstream location when the table is tilted.

The table structure, according to an alternate embodiment, can also include a horizontally-moving backing surface that is either driven by a linear drive or that is spring-loaded and that, based upon sensor signals, programmed instructions stack pressure thereon, moves in response to the formation of a stack upon the table top to continuously restrain the downstream end of the stack. The base of the table structure can also include a lifting device that enables the table top to be raised and lowered in either the substantially-vertical or substantially-horizontal position. This enables a stack to be loaded onto a raised shelf on a cart or, alternatively, to the top of an already-loaded stack on the cart.

The tilting table and/or the conveyor according to this invention can include sensors at predetermined locations thereon that can control various drive functions so that loading and unloading of a stack is automated. The table top can also include a movable hold-down bracket that overlies the stack at selected times to retain the stack on the table.

The backing support for the tilting table according to this invention can also include a plurality of straps positioned along a surface thereof to isolate a bottom of the stack from the surface of the backing support. As the backing support is relocated, typically by lateral movement, out of engagement with the stack, any slack in the straps is taken along a surface of the backing support opposite a surface that faces the bottom of the stack. This enables the backing support to be moved relative to the bottom of the stack while the stack-engaging portions of the straps remain stationary. Thus, the bottom of the stack does not slide in response to the movement of the backing support.

According to an alternate embodiment, the cart of this invention can include a web guide roller and a brush positioned to overly each of the storage spaces in the cart. The brush can be pivoted so that it can selectively overly an approximate midsection of each storage space.

Another alternate embodiment for a cart, according to this invention, can comprise a plurality of smaller carts, each having a base with wheels that can be interlocked to form a larger cart. Each smaller cart can comprise a pair of perpendicularly-intersecting upstanding walls joined to a rectangular base. The walls can be joined in a face-to-face relationship to form a four-quadrant cart according to this invention. The tilting table according to this embodiment can be adapted to receive a cart section and a web can be driven onto an upstanding wall of the cart section as the wall rests upon the table top. When the cart has received a full stack, the table top and cart can be rotated into a substantially-vertical position to enable the cart to be moved away from the table.

A stack ejector or transport dolly can be provided in conjunction with the carts of this invention. The dolly can include a support structure or fingers that pass under a bottom of the stack when the stack stands upon the base of the cart. The cart can be provided with a plurality of grooves to receive corresponding fingers or tines of the support structure. The dolly can include a floor brake that enables the dolly to stand upright restrained from lateral movement along the floor. The dolly can also include stand legs that are either foldable or permanently deployed that enable the dolly to stand in a resting position with the stack extending at an acute angle relative to the floor surface. In either a standing or angled position, web can be fed from the dolly via a web guide provided at an upper end of the dolly. The support structure of the dolly can be angled to bias the web stack against supporting walls on the back and side of the dolly frame.

The cart can also be provided with a floor-locking mechanism that restrains the cart from lateral movement on a floor surface. Such a locking mechanism can comprise a raised base structure, fixedly attached to the floor, having a well that receives a movable pin on the cart. The pin can be positioned centrally on the cart so that the cart can rotate on the floor about the raised base structure (via caster wheels), but is restrained from lateral movement, other than rotation. Similarly, the cart base can comprise an upper base and a lower base, wherein the lower base includes wheel-locking mechanisms that fixes the lower base laterally at selected times while the upper base is movable rotationally relative to the lower base. The upper and lower base can be lockable to maintain the upper base in a fixed position. By enabling the cart to be laterally fixed but rotatable, each of a plurality of storage spaces can be located adjacent a utilization device and fed to the utilization device as needed.

BRIEF DESCRIPTION OF THE DRAWINGS

The foregoing and other objects and advantages of the invention will become more clear with reference to the following detailed description of the preferred embodiments as illustrated by the drawings in which:

FIG. 5 is a perspective view illustrating the table substantially in the position of FIG. 4 but with the door withdrawn as illustrated after the stack cart has been moved into position;

FIG. 6 is a perspective view illustrating the table being moved back to it horizontal position with the flap engaged between the conveyor and the table and with a new group of forms now being conveyed onto the table;

FIG. 22 is a perspective view of an alternate embodiment of a stack ejector or dolly system according to this invention;

FIG. 23 is a side view of the movement of the dolly according to FIG. 22;

FIG. 24 is a partially broken away side view of the feeding of web material using the dolly of FIG. 22;

DETAILED DESCRIPTION OF THE PREFERRED EMBODIMENT

The drawings in this application illustrate a preferred embodiment for a novel system for stacking continuous folded forms. The system basically employs at least two main elements, one being a table that is adapted to receive forms from a conveyor, and which table is tiltable; and a stack rack or stack cart that is adapted to receive preferably multiple stacks from the table.

Figure 1:
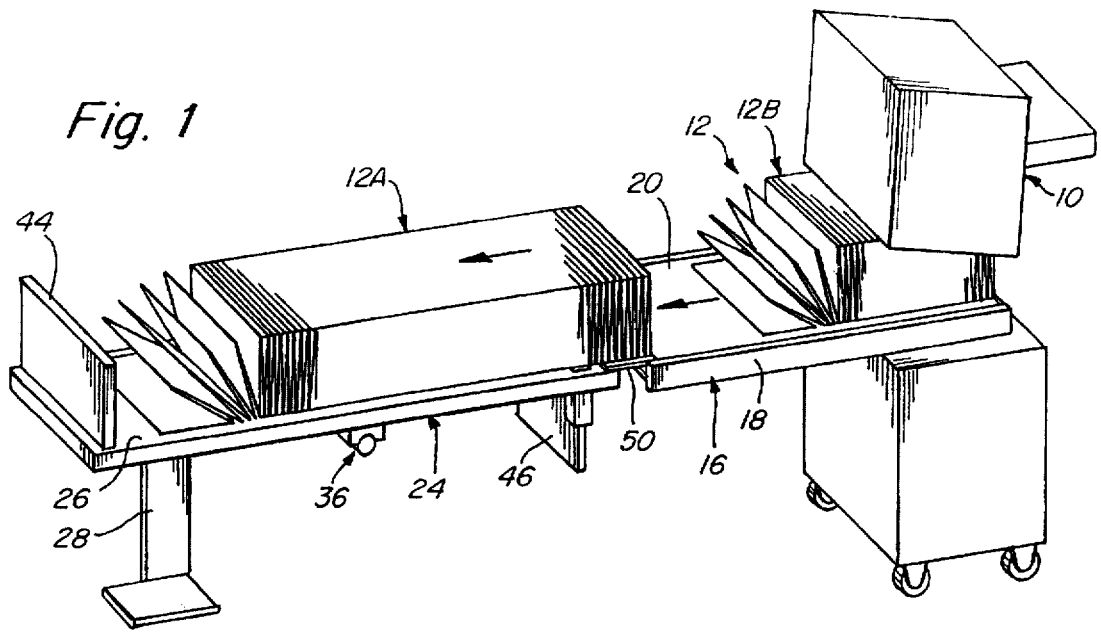
FIG. 1 is a perspective view illustrating a portion of the system of the present invention illustrating a new run coming out of the folder and moving forward on the conveyor as well as a run that is almost totally disposed on the table.

FIGS. 1–7 herein are perspective views that illustrate the sequences of events that occur in connection with the use of the apparatus and method of the present invention. Generally speaking, FIG. 1 shows a finished run that is almost completely disposed on the tilt table and a new run coming out of the folder and moving forward on the conveyor. The run that is on the table has just passed off of the conveyor and will then stop moving.

Figure 2:
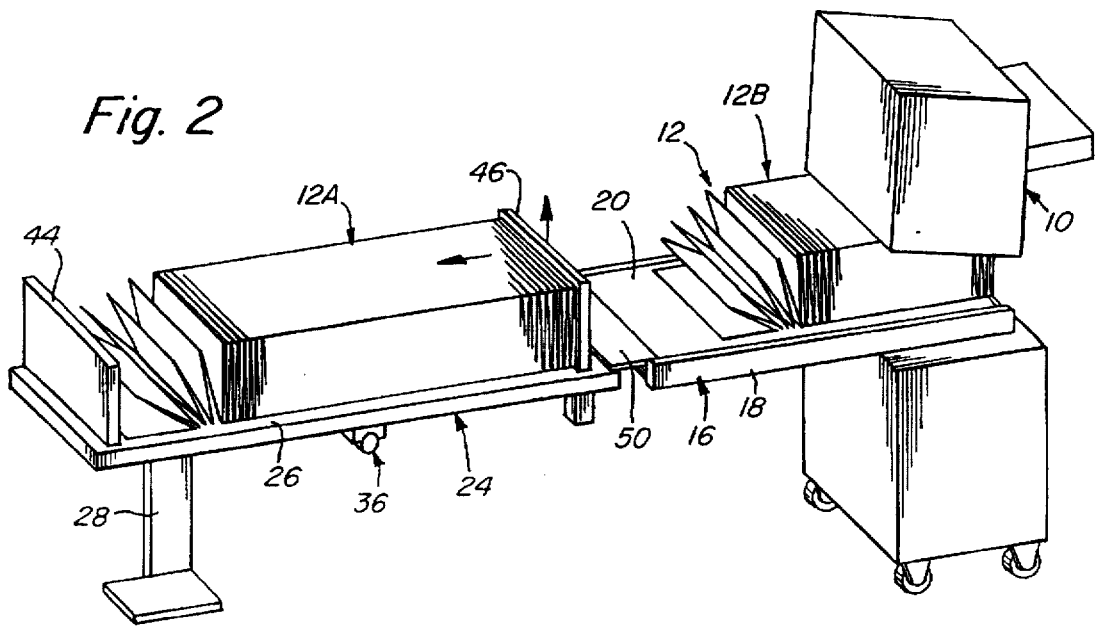
FIG. 2 is a perspective view similar to that shown in FIG. 1 but now illustrating a next step in which the door or backing support is moved into position for retaining the stack on the table.

FIG. 2 shows the run moved sufficiently to allow the door to come up against the last sheet. This door operation can be carried out manually or some type of automatic system could be employed.

Figure 3:
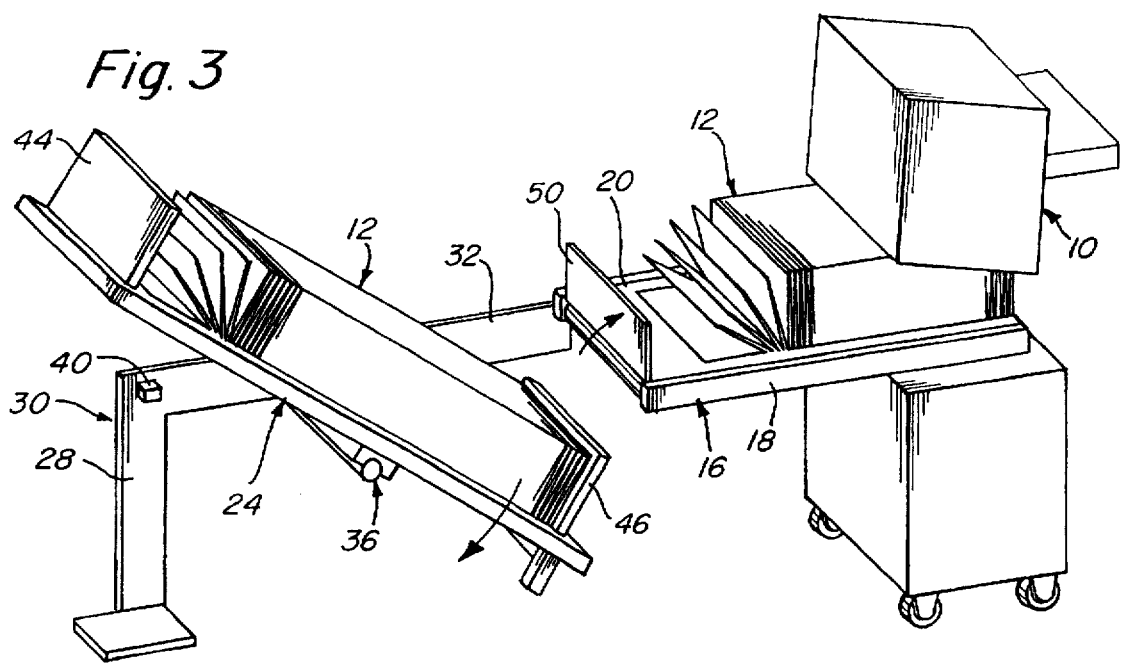
FIG. 3 is a perspective view showing the flap on the conveyor flipped up and with the table being partially tilted.
Figure 4:
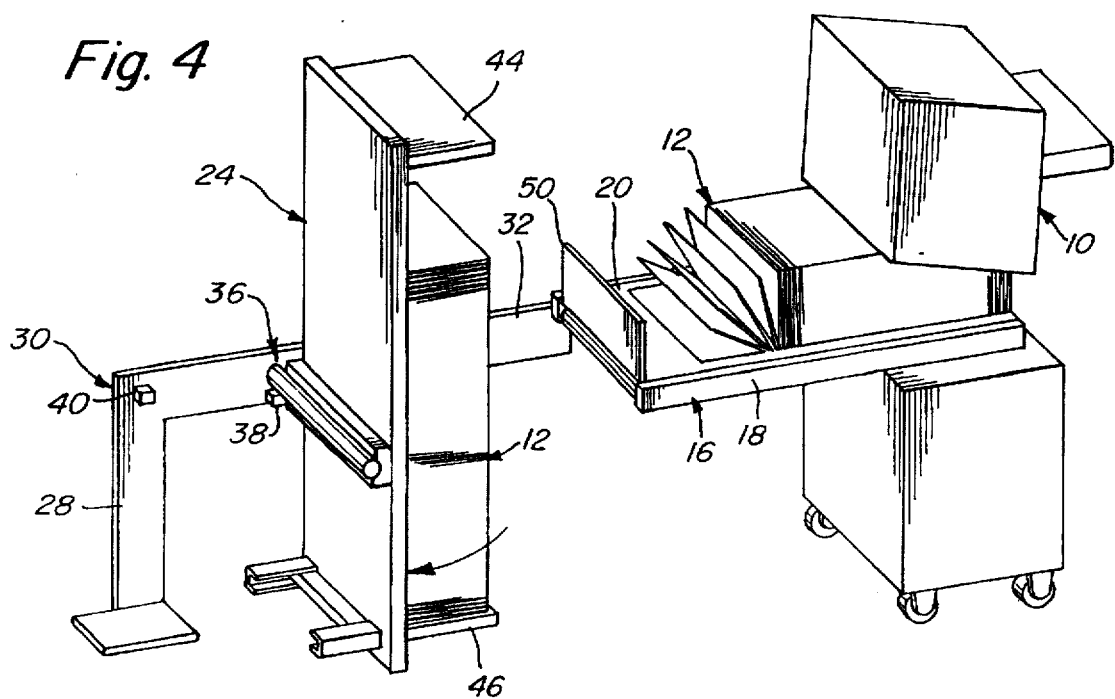
FIG. 4 is a perspective showing the table now completely tilted to a vertical position.
Figure 8:
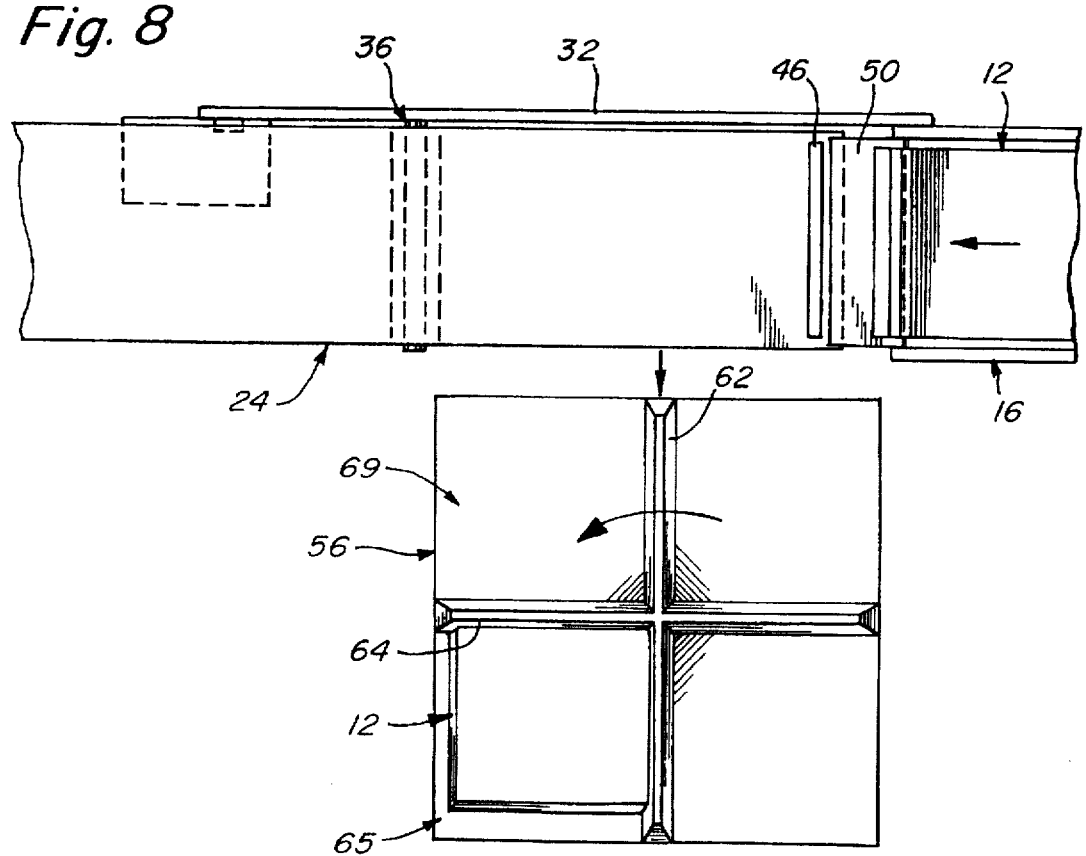
FIG. 8 is a top plan view showing the rack pulled out an rotated with another empty bay ready for the next run which is passing over the flap and about to pass over the end of the door or backing support which is now flush with the surface of the tilt table.

FIGS. 2–5 show the new run slowly progressing out of the folder. FIG. 3 shows the stack partially tilted while FIG. 4 shows the stack in its fully tilted vertical position. FIG. 5 shows the cart engaging with the stack and FIG. 6 shows the cart after having received the stack being moved away so that it can be rotated such as is illustrated in FIG. 8.

With more particular reference to the structure illustrated in the drawings, there is provided a folder and separator 10 that folds the forms into the folded form illustrated in the drawings. The folded forms are shown at 12. A folder and separator system in such as that described in Applicant's U.S. Pat. No. 5,149,075 can be utilized.

Associated with the folder 10 is a conveyor 16 which may have fixed side walls 18 and a conveying belt 20. The conveyor 16 conveys the forms 12 therealong. In FIG. 1 there is actually illustrated a first stack 12A that has already progressed to the tilt table 24 and a stack 12B that is still progressing along the conveyor 16.

The tilt table 24 has a table top support surface 26 and in the embodiment illustrated herein is comprised of only a single leg 28 although the table could be supported by more than one leg. As illustrated in FIGS. 3 and 4 there is a support bracket 30 that has leg 28 as one member and a further support leg 32 that may fasten to a side of the conveyor 16.

As has been indicated previously, the table 24 is a tiltable table and for this purpose there is provided at the bottom of the table flat surface a pivot mechanism 36 illustrated perhaps best in FIG. 4. This pivot mechanism is supported from the leg 32 of the bracket 30.

Associated with the table are stops. There is a stop 38 illustrated in FIG. 4 that controls the vertical position of the table. There is also a stop 40 illustrated in FIG. 4 that controls the horizontal position of the table 24.

At an end of the table surface 26 remote from the conveyor there is provided an upright end wall 44. This may be permanently fixed in position and simply prevents the stack from falling off that end of the table. The tilt table may also have side walls extending the longitudinal length thereof. Such side walls are not illustrated in the drawings herein.

At the end of the table surface 26 close to the conveyor 16 there is provided a backing surface in the form of the door 46. The door 46 may have detent positions associated therewith so that it can be slid but held in alternate positions. In this regard, in FIG. 1 the door 46 is shown depending downwardly so that the top surface thereof, such as illustrated in FIG. 8, is essentially flush with the table surface 26. In this way, the sliding door is not at all interfering with the progress of the stack 12A as it is moved from the conveyor onto the tilt table. FIG. 2 on the other hand shows the door 46 moved to its upper position whereby detent means or the like it can be retained in that position.

FIGS. 1 and 2 also illustrate a flap 50 that is adapted to bridge between the conveyor 16 and the table 24. The flap 50 is pivotal between a position such as that illustrated in FIG. 2 and that illustrated in FIG. 3. In the position of FIG. 2 the flap 50 has its top surface flush with the top of the conveyor surface namely surface 20 and the top of the table or surface 26. In this way, forms that progress along the conveyor are not at all impeded by the flap but simply pass over the flap.

The flap 50 may also be moved to an upright position as illustrated in FIGS. 3 and 4. In its uprights position the flap 50 may prevent the forms on the conveyor 16 from progressing any further than the position of the flap.

In FIG. 1 the stack 12A has progressed to a point where the conveyor is no longer moving it. The rear end of the stack overlies the flap 50. The sliding door 46 is in its downward position. The front end of the stack may be against the wall 44 or spaced from it as illustrated in FIG. 1.

After the position of FIG. 1, in FIG. 2 the operator may move the stack 12A to the left as illustrated by the arrow and the door 46 is then moved upwardly as also illustrated by the arrow. The door 46 now functions as an opposite end wall so to speak and when the table 24 is tilted it will be seen that the door 46 functions as a base rest surface for the stack 12A. In FIG. 2 the flap 50 is still in its horizontal position.

FIG. 3 now illustrates the flap 50 moved upwardly so as to prevent any further forms from progressing off of the conveyor. Also, in FIG. 3 the table 24 is shown being partially tilted. In FIG. 4 the table has been tilted to its full vertical position whereby the associated stack 12 supported on the table is also in a vertical stack. Note in both FIGS. 3 and 4 that the door 46 is in a position where it functions as a resting surface for the bottom of the stack. In FIGS. 3 and 4 the flap 50 is also maintained in its upright vertical position.

With regard to FIGS. 3 and 4 it is noted that the table 24 is illustrated as being rotated clockwise. Similarly, the table can be rotated counterclockwise. In other words, the table can pivot in either direction. If the table is pivoted in a counterclockwise direction then the end wall 44 functions as a rest surface for the bottom of the stack.

Figure 7:
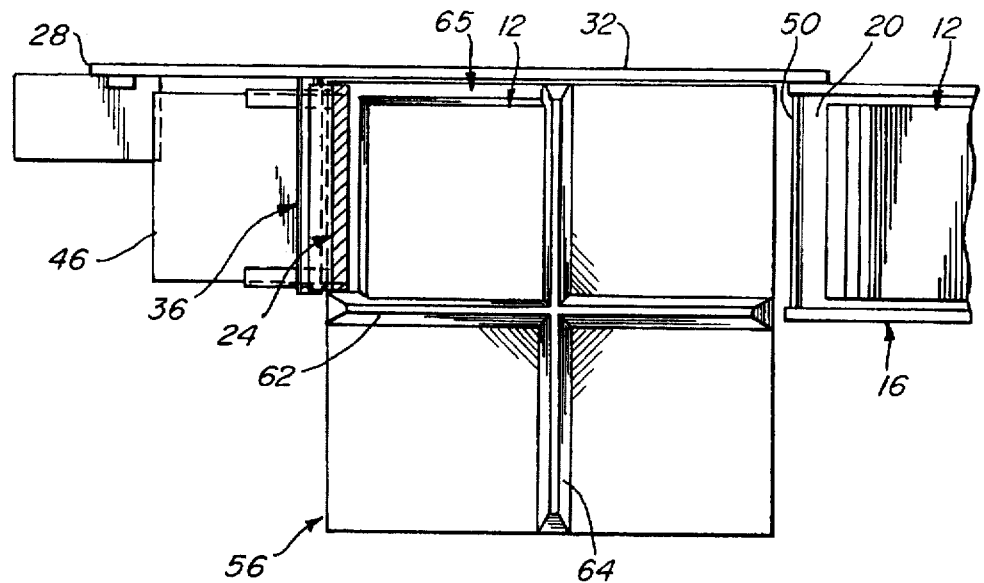
FIG. 7 is a cross sectional view taken along line 7—7 of FIG. 5.

FIG. 5 illustrates the tilt table 24 in the same position as in FIG. 4. The stack 12 is shown in dotted outline. However, FIG. 5 also illustrates the stack rack or stack cart 56 of the present invention. The cart 56 has a base 58 that is supported by four rollers or casters 60. Supported from the base 58 are crossed walls 62 and 64 which define four separate vertically disposed compartments as clearly illustrated in FIGS. 5 and 6. These compartments are also illustrated in FIGS. 7 and 8 such as the compartment 65 that receives the stack 12.

The walls 62 and 64 may be tapered slightly such as illustrated in FIGS. 5 and 6 or they may be straight vertical walls extending from the base. The base 58 in each compartment is preferably tilted such as from a front edge 58A slightly downwardly to a more rear edge 58B (see FIG. 6). This tilting of the base of the cart toward the center assists in holding the stacks in a more stable position on the rack.

FIG. 5 illustrates the cart 56 having been moved into position. The base 58 of the cart is positioned essentially under the sliding door 46 so that there is no interference between the cart and the table 24. It is noted in FIG. 5 that for example, the wall 62 of the cart engages the side of the table as the table is in its vertical position. The door 46 is then slid in the direction of the arrow so as to disengage from the bottom of the stack 12. The stack 12 is then resting upon the base 58 of the cart 56.

The cart 56 may then be moved away from the table such as to the position of FIG. 6. FIG. 6 also illustrates the table being moved in the direction of the arrow in FIG. 6 so that the table is now again in a horizontal position and is ready for the receipt of a further stack. Note in FIG. 6 that the flap 50 is moved downwardly so that the conveyor can now operate to move the next stack onto the table 24.

Thus, in FIG. 6 the cart is shown with only a single stack on it and in a position moved away from the tilt table. FIG. 7 is a cross sectional view taken along line 7—7 of FIG. 5 and thus illustrates the position in a plan view of the cart relative to the tilted table. FIG. 8 illustrates the cart 56 now rotated in the direction of the arrow so that a new compartment 69 may be moved into position to receive a subsequent off of the tilt table.

Figure 9:
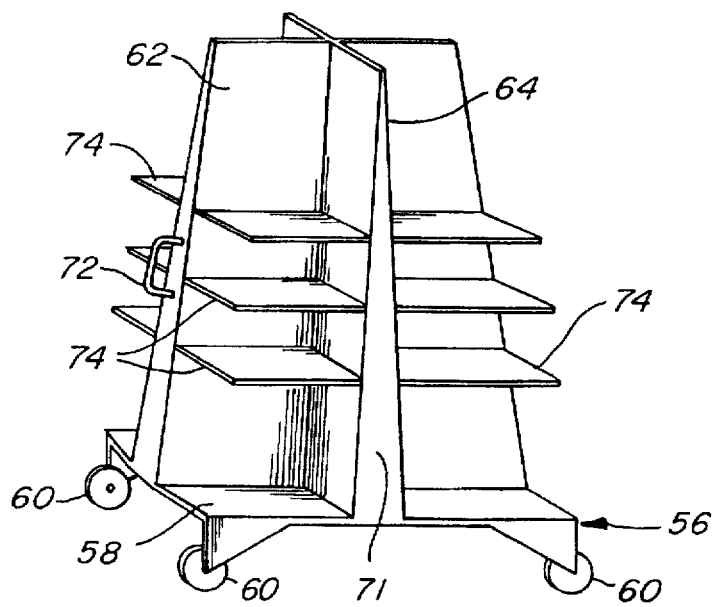
FIG. 9 is a perspective view of an alternate stack cart construction employing removable shelves associated with each compartment.

Reference is also now made to FIG. 9 for an alternate embodiment of the stack rack of the present invention. Once again, this rack is usable to move fan folded or cut-sheet stacks easily and conveniently to the next stop in the output handling sequence. In the embodiment of FIG. 9 the same reference characters are used to identify basically the same components illustrated in the prior figures. However, in the embodiment of FIG. 9 there are twelve removable shelves 74 as well as four fixed base shelves 58. These removable shelves in particular allow varying height stacks to be accommodated on the cart.

The cart in accordance with the present invention has a substantially large capacity. It can stock as much as five hours or more of production or, for example, up to 100,000 16-pound 18.5×12 inch pages. This cart occupies in one embodiment approximately only 6.9 square feet. In addition to the casters 60 that are employed it also preferably has at least one handle 72. All of the shelves that are employed are preferably slanted inwardly so as to keep the stacks square. The cart is made of solid, rugged construction. It is preferably made of a heavy gauge welded steel.

Also noted in FIG. 9 is that the walls are preferable tapered such as illustrated at 71 so as to again provide for more stability in holding the stacks of folded or cut-sheet material.

Figure 10:
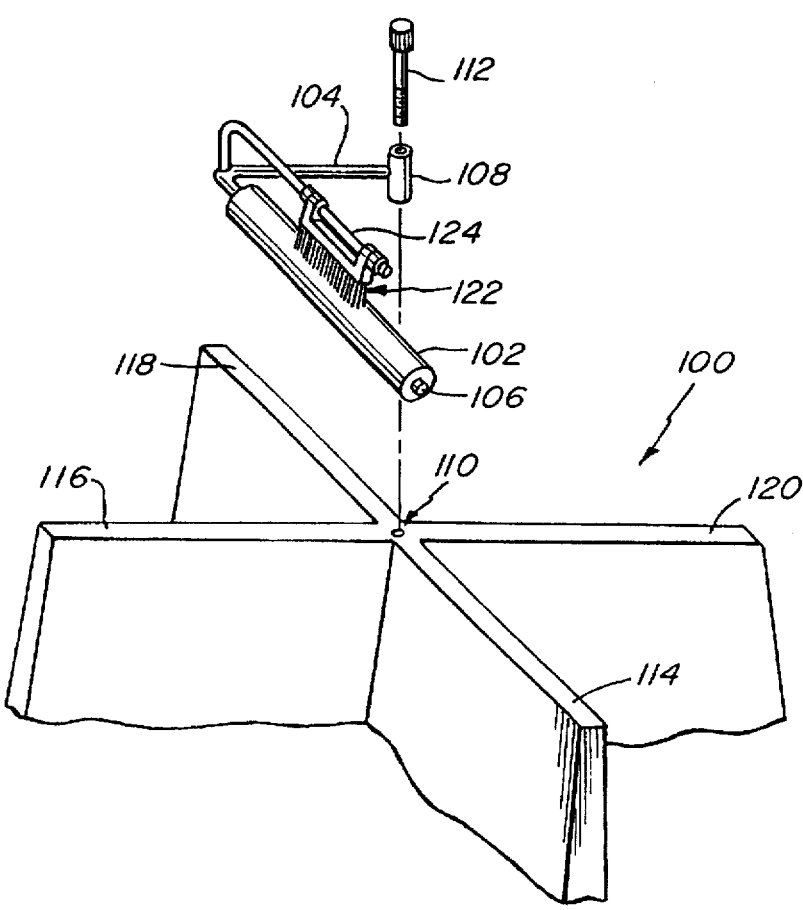
FIG. 10 is an exploded perspective view of an alternate embodiment of the stack cart according to this invention including a movable brush and roller assembly that enables feeding of folded material from the cart to a downstream utilization device.

A multisection cart 100 similar to that detailed in FIGS. 7–9, for use with or without shelves, is illustrated in FIG. 10 including the additional feature of a pivoting web guide roller 102 mounted on an L-shaped bracket 104 so that the roller 102 is free to roll along an elongated portion 106 of the bracket 104. The bracket is mounted by a vertical boss 108 to the center 110 of the cart 100 with a bolt 112. According to this embodiment, the L-shaped bracket is free to pivot so that the roller 102 can overly any one of the four quadrants defined by the walls 114, 116, 118 and 120 of the cart 100. Located adjacent the roller (above the roller in this example) is a brush 122 that pivots on a support bar 124 into contact with the roller 102. As further detailed in FIG. 11, the roller 102 and brush 122 overly the quadrant defined by walls 114 and 116 to guide (127) web 128 out of a stack 130 located on the cart 100. The pivoting brush 122 bears against the roller 102 with sufficient pressure to maintain the web pressurably against the roller surface. The screw 112 can be provided with a locking mechanism, or alternatively, can be tightened so that it rotationally maintains the boss 108 in a fixed position. Thus, tension exerted on the web does not cause the brush and roller assembly to rotate.

Figure 11:
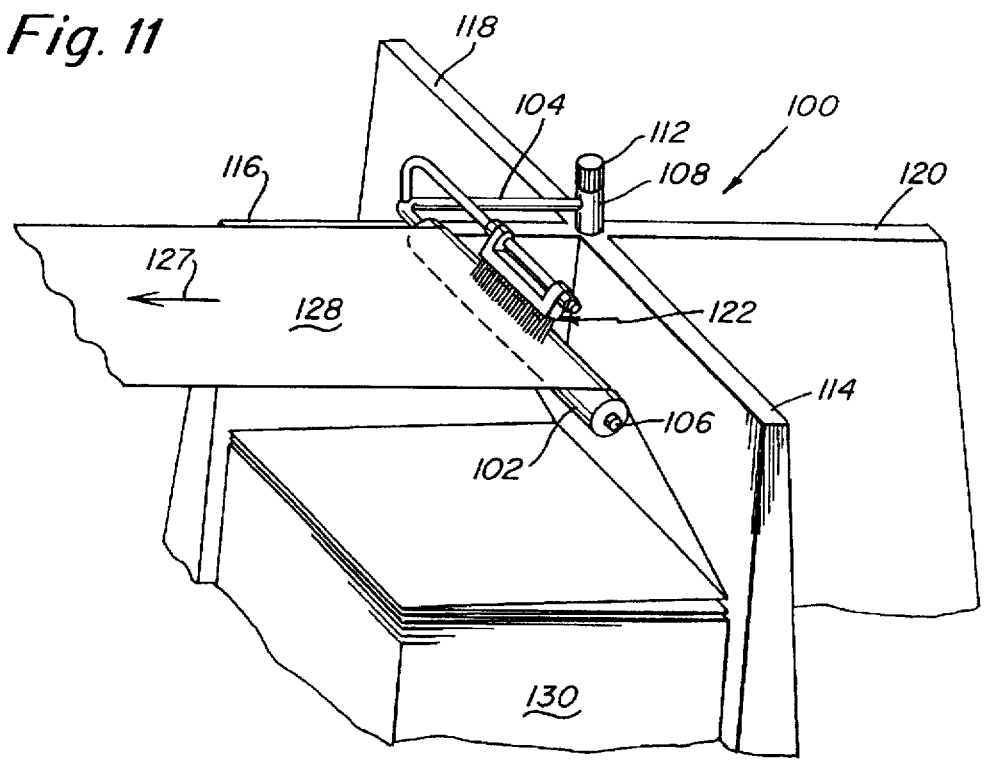
FIG. 11 is a perspective view illustrating the feeding of folded material utilizing the cart according to FIG. 10.
Figure 12:
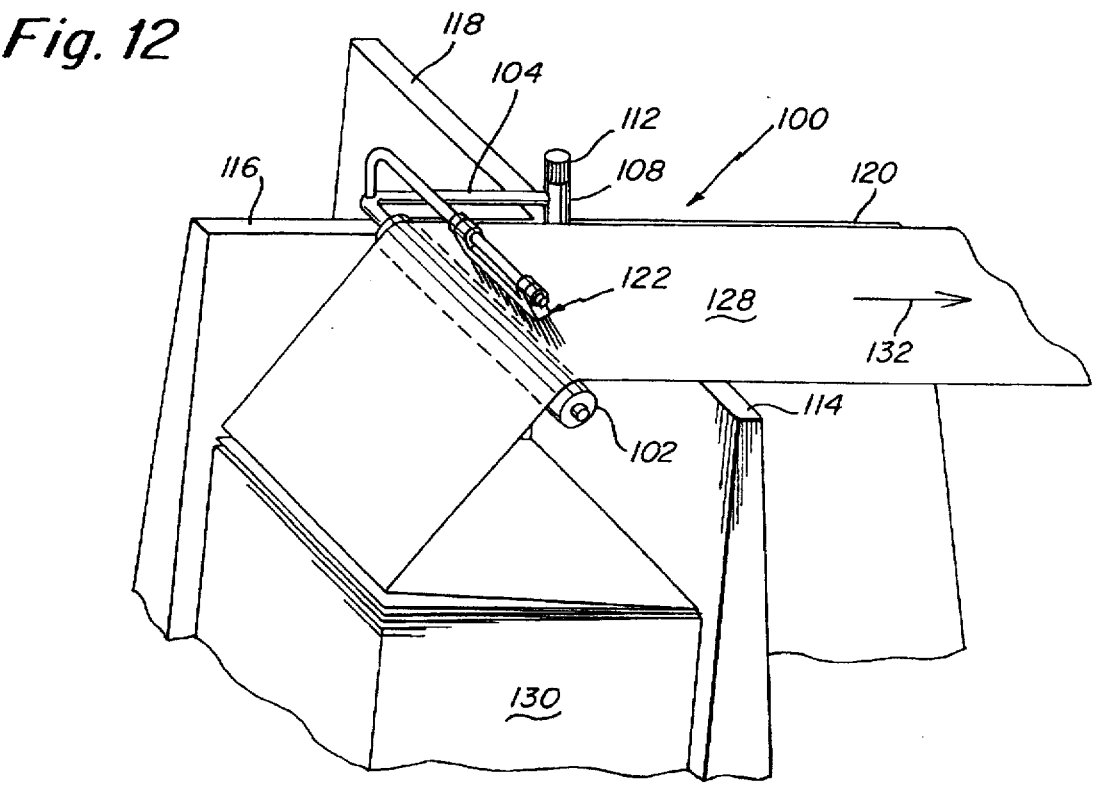
FIG. 12 is a perspective view illustrating the feeding of folded material in an alternate direction from that illustrated in FIG. 11.

As further detailed in FIG. 12, the web 128 can be guided in an opposite direction (arrow 132) from the direction (arrow 127) detailed in FIG. 11. The roller 102 is, thus, provided at a position that overlies an approximate midsection of the cart quadrant. Hence, the web 128 feeds freely in either direction out of the stack 130 on the cart 100. Note that, due to the symmetry of the walls 114, 116, 118 and 120 of the cart 100, rotation of the roller 102 and brush 112 assembly about the center of the cart 100 enables it to be positioned over the approximate midsection of each quadrant of the cart. Thus, bidirectional feeding of a web from a stack located in any one of the quadrants of the cart is enabled.

As further illustrated in FIG. 12, the pivoting brush rotates so that it is angled in a direction (arrow 132) of web guiding. However, the brush's weight maintains it against web 128 at the location in which the web and roller contact each other.

Figure 13:
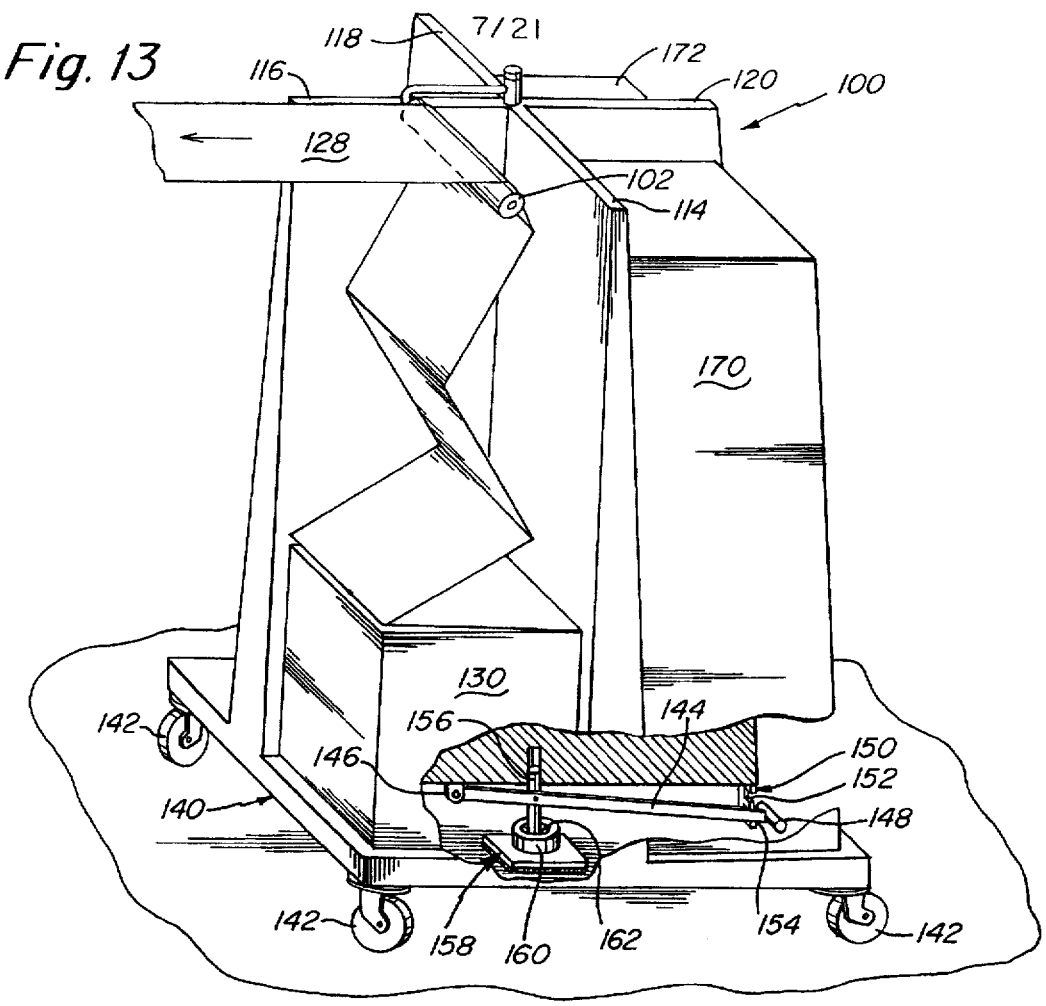
FIG. 13 is a perspective view of alternate embodiment of the cart of FIG. 10 including an anchoring device that enables relatively stationary location of the cart during feeding.

FIG. 13 illustrates a further modification to the cart 100 according to this embodiment. The cart base 140 includes conventional wheels 142 that can comprise pivoting casters with or without individual antirotation locking mechanisms. The base 140 also includes a lever 144 pivotally attached to a bracket 146 on the lower side of the base 140. The free end of the lever 144 includes a handle 148 that projects from the base 140 sufficiently for a user to grasp it. The base 140 also includes a bracket 150, adjacent the handle 148, shaped so that the lever 144 can be sprung sideways for selective placement into one of at least two notches 152 and 154 on the bracket 150. The lever 144, along its midsection, also includes a pivotally mounted, vertically aligned, pin 156 that, upon pivotal movement of the lever 144 between notches 152 and 154 translates upwardly and downwardly relative to the base 140. The pin 156 extends upwardly into the center of the cart and, thus, is typically concealed by the walls 114, 116, 118 and 120 at their junction. Thus, the pin 156 does not interfere with stacks located upon the cart. The pin 156, in its lowered position, as shown in FIG. 13, is received by a floor-mounted base 158 that includes a raised portion 160 with a dish-shaped or conically-shaped well 162. When the pin 156 is lowered, the raised portion 160 of the base 158 surrounds the lower end of the pin 156 as it rests within the well 162. Hence, the weighted cart 100 is restrained against lateral movement along the floor.

Such a base 158 can be provided at various locations adjacent utilization devices (164 shown in Phantom). The cart 100 can be filled and then subsequently moved adjacent a base 158 at which the lever 144 is lowered so that the pin 156 engages the base 158. The cart is, thus, retained laterally relative to the utilization device.

Figure 14:
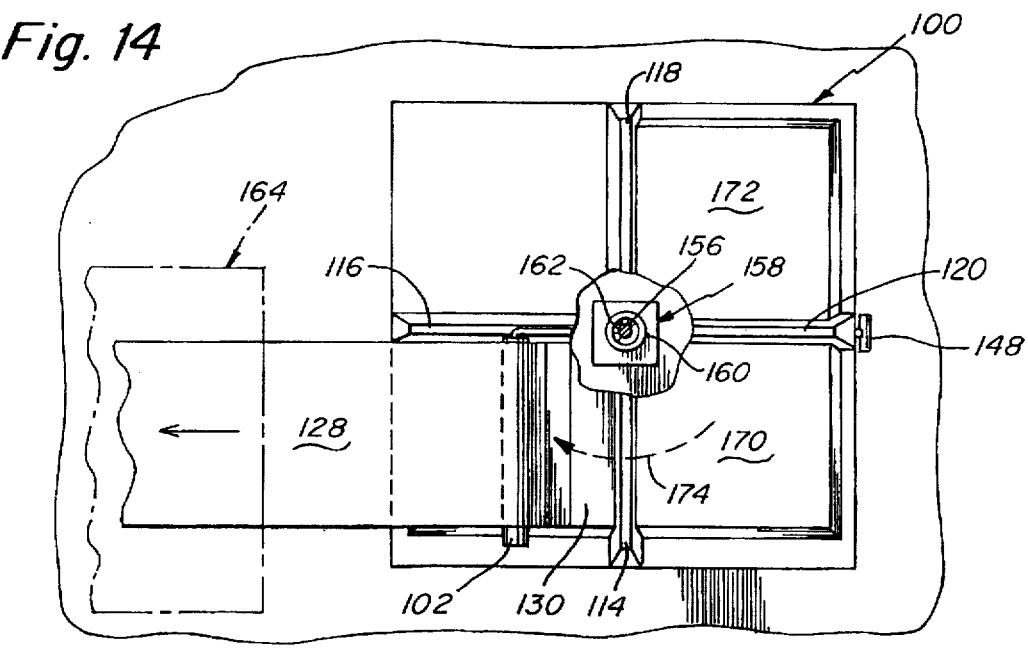
FIG. 14 is a top view of the cart of FIG. 13.

As detailed in FIGS. 13 and 14, the cart 100 has been loaded so that web stacks 170 and 172 are located in adjacent quadrants to the feed stack 130. The pin 156 and well 162 are constructed so that the cart 100 can be rotated (curved arrow 174) about the pin to position each quadrant of the cart 100 in an unloading location relative to the utilization device 164. Thus, as each stack is exhausted, the stack in an adjacent, or opposite, quadrant can be moved into position for further unloading. As described above, the web guide roller 102 is simultaneously moved into an overlying position for use with the desired quadrant.

While a cart 100 having four quadrants for storing web stacks is detailed according to this embodiment, it is contemplated that carts that accommodate fewer or greater numbers of stacks storage location such as a hexagonal or octagonal cart, can be utilized with the web guide roller assembly and movable pin arrangement according to this invention.

Figure 15:
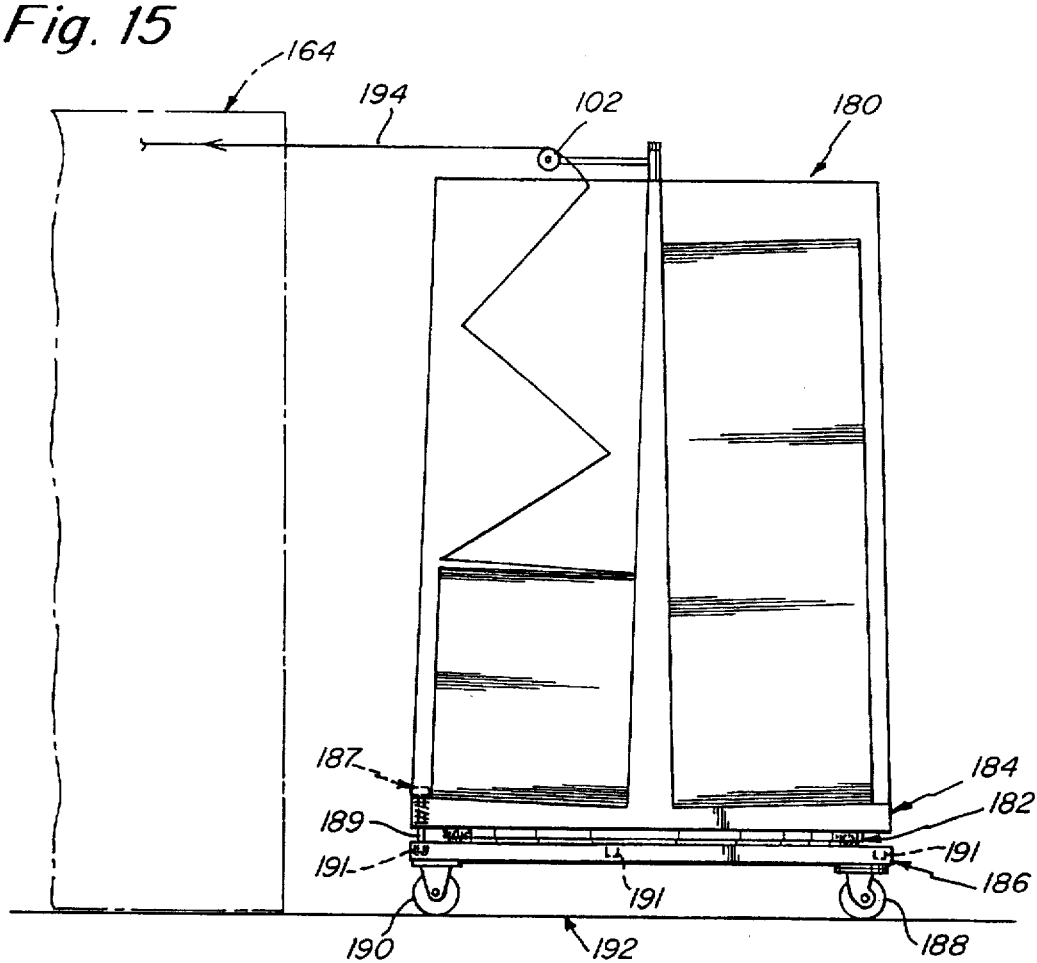
FIG. 15 is a side view of alternate embodiment of the cart of FIG. 10 including a turntable structure for pivoting of the cartrack relative to the cart base.
Figure 16:
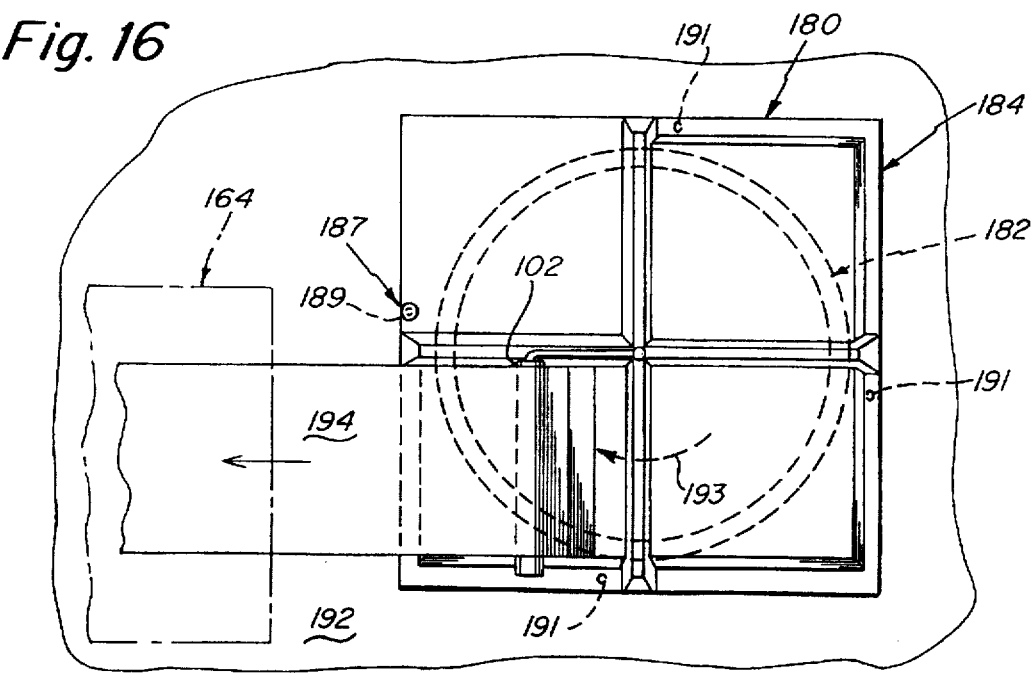
FIG. 16 is a top view of the cart of FIG. 15.

FIG. 15 illustrates a modified cart 180 according to an alternate embodiment of this invention in which a turntable-like bearing structure 182 is provided between an upper base 184 and a lower base 186 of the cart 180. The lower base 186 includes caster wheels 188 and 190. In this embodiment, the rear pair wheels 188 include rotatable brackets, that enable the wheels to pivot, while the front pair of wheels 190 include brackets that are fixed to the base 186 against pivotal motion. In addition, while not shown, one or more of the wheels 180 and 190 can include an antirotation locking mechanism, or the base can include a floor brake to maintain the cart 180 stationary relative to the floor 192. As further detailed in FIG. 16, the upper base 184 is rotatable (curved arrow 193) on the bearing structure 182 relative to the lower base 186 to position each quadrant of the cart in an unloading position with respect to the utilization device 164. It is contemplated that the lower base 186 can be locked into a stationary position relative to the floor, by a variety of mechanisms, so that the resulting rotation is similar to that detailed in FIGS. 13 and 14.

The cart 180 also includes a web guide roller 102 of the type described hereinabove to facilitate feeding of web 194 to the utilization device 164. The upper base 184 can, itself, be locked against rotation relative to the lower base 186 using a latch mechanism 187 of any conventional design such as a spring-loaded pin 189, located on the upper base 184, that engages holes 191 located adjacent each of the four sides of the lower base 186.

Figure 17:
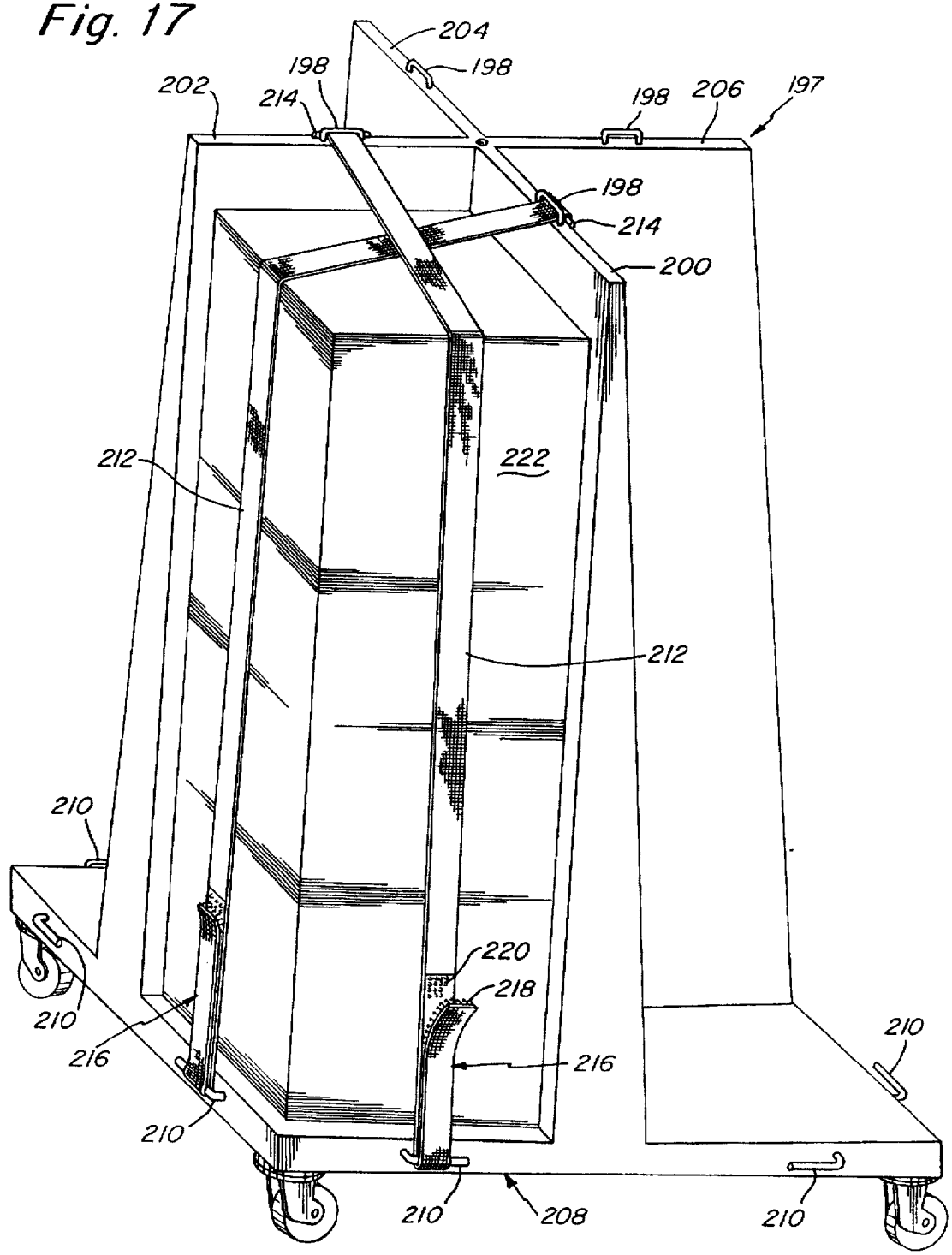
FIG. 17 is a perspective view of alternate embodiment of the cart of FIG. 10 including hold-down straps for securing stacks to the cart during transport.

To facilitate transport of large heavy stacks about a facility, it can be desirable to fix the stack securely into a quadrant of the cart 197. Hence, as detailed in FIG. 17, the cart 197 includes upper loops 198 along the tops of each of the four walls 200, 202, 204 and 206. The loops 198 are positioned approximately midlength along each of the four walls. Each quadrant of the base 208 further includes an open-ended, L-shaped, bar (or alternatively a closed-ended loop) 210 also located approximately midlength along each quadrant of the base 208. Between each of the opposing loops 198 and 210 extends a hold down strap 212 constructed from a strong durable material such as woven nylon or cotton. At an upper end of the strap 212 is located a bar 214 having length that is sufficient to interfere with passage through the loop 198. The lower end 216 of the strap 212 includes opposing strips of fastening material such as a hook 218 and loop 220 material known as Velcro®. Alternatively, other conventional clasps or buckles can be provided to the end 216 of the strap 212.

Each quadrant, according to this embodiment, includes two straps 212 extending from upper walls (200 and 202 as shown) to corresponding lower sections of the base 208. The stack 222 is, thus, securely maintained in the cart 197 during transport. To further enhance the versatility of the cart system according to this invention, a fitted cover (not shown) of cloth or synthetic material can be provided to enclose the cart during transport.

Figure 18:
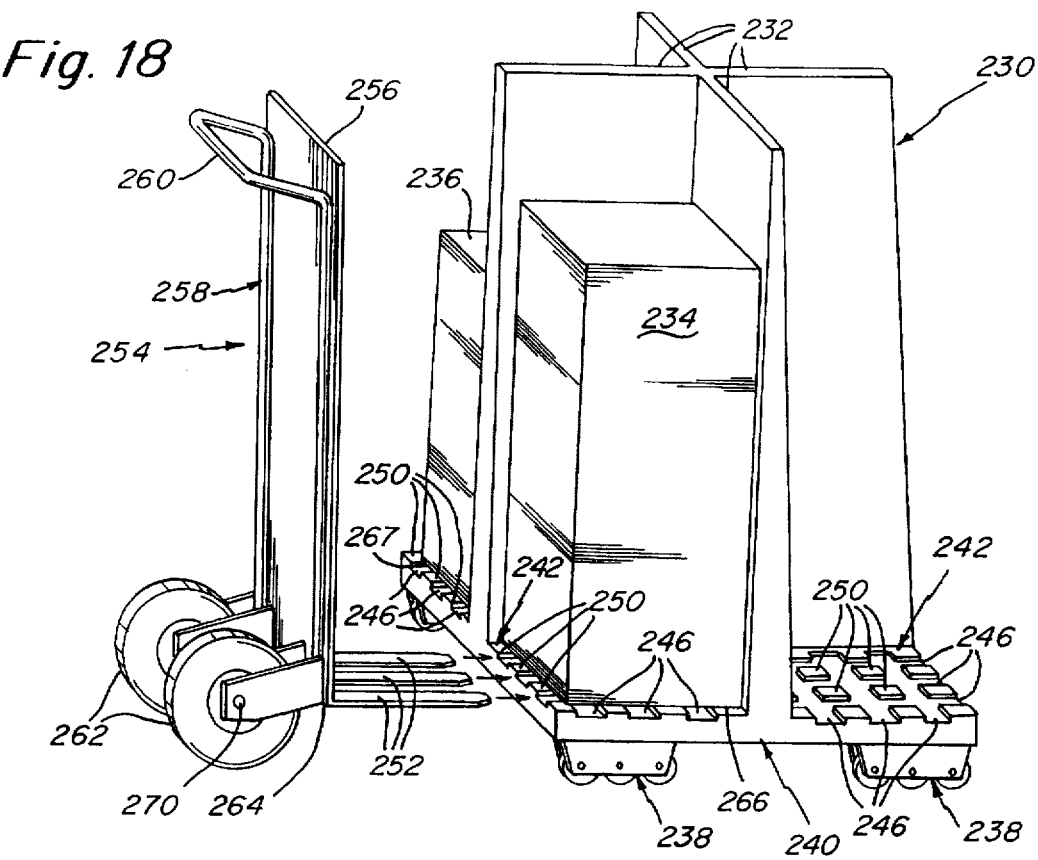
FIG. 18 is a perspective view of an alternate embodiment of a cart according to this invention including recesses along a support base thereof for receiving corresponding fingers of a stack ejector or dolly for transfer of a stack therefrom.

FIG. 18 details another modification to the cart structure according to this invention. The cart 230 includes walls 232 that define four quadrants for supporting stacks 234 and 236 therein. The cart 230 includes multiple wheel sets 238 according to this embodiment. The three wheel set 238 however, can be substituted for a more conventional caster arrangement as detailed above. Alternatively, the multiple wheel sets can be provided to any of the alternate embodiments of carts described hereinabove.

The cart 230 includes a base 240 for supporting stacks 234 and 236 thereon. The upper surface 242 of the base 240 includes channels 246 that extend perpendicularly to each outer edge of the base 240. The channels, hence, delineate the base into a set of raised "islands" 250 that contact and support the bottom 266 and 267 of the stacks 234 and 236, respectively, thereon. The islands 250 should have a size and spacing therebetween that is sufficient to support the bottom 266 of the stack 234 without substantial bowing of the bottom 266 into the channels 246. Channels 246 having a width of between 2 and 3 inches should be sufficient to prevent substantial bowing. However, wider or narrower channels are also contemplated according to this invention.

The channels 246 have a depth sufficient to receive corresponding fork-like tines or fingers 252 of a stack ejector or transport dolly 254. The dolly 254 according to this embodiment includes a backing surface 256 for supporting a stack thereon and a tubular frame structure 258 terminating at an upper end in a U-shaped handle 260. The lower end of the dolly 258 includes a pair of enlarged wheels 262. The tines or fingers 252 should be of sufficient thickness and strength to support a stack of web material thereon. It can be desirable to provide reinforcement (such as welded gussets) at the location 264 in which the fingers 252 interconnect with the backing surface 256 and frame 258.

Figure 19:
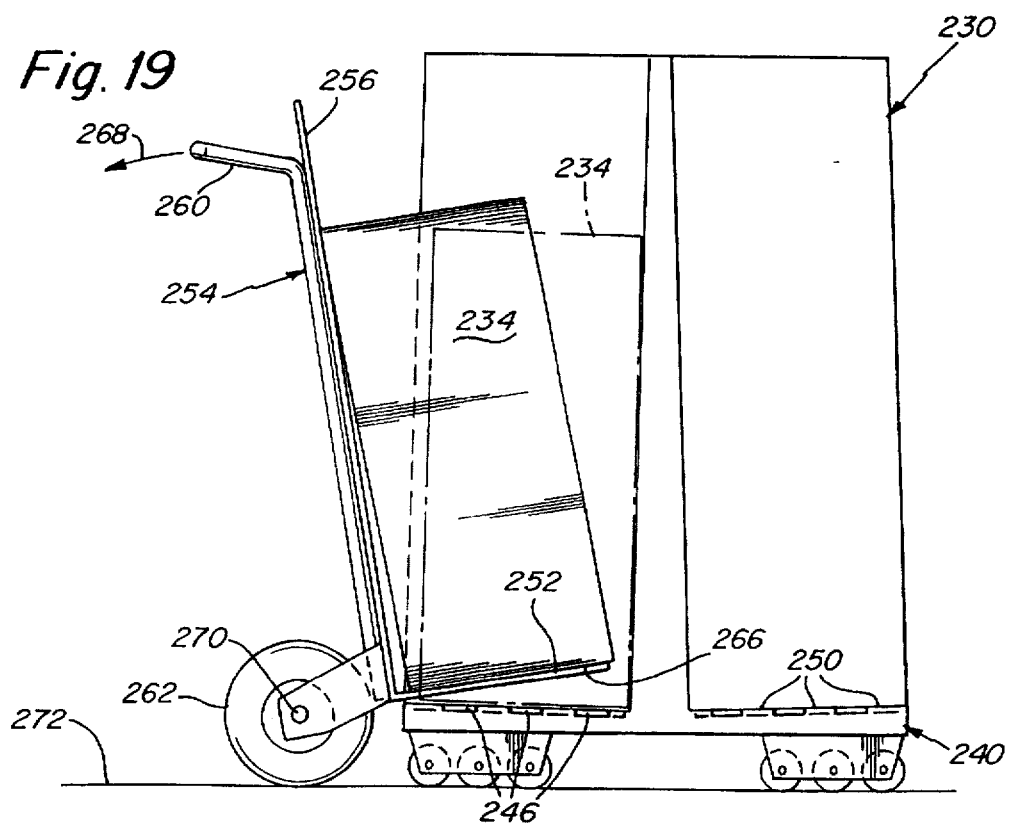
FIG. 19 is a side view illustrating the transfer of a stack from the cart of FIG. 18.

As further detailed in FIG. 19, the fingers 252 are inserted into the slots 246 along a given side of the cart base 240 so that the fingers 252 pass under the bottom 266 of the stack 234. The dolly 254 is rotated (arrow 268) about its wheels 262 to raise the stack 234 off of the base 240. The balance point of the dolly is located so that the loaded dolly can be rotated relatively easily about axles 270 of the wheels 262. In this manner, stacks can be removed from the cart quickly for further processing or transport to another location. The cart 230 according to this embodiment can be provided with various locking mechanisms according to this invention so that it remains laterally stationary relative to the floor 272 as a stack is unloaded by the dolly 254.

Like other embodiments herein, the cart 230 according to this invention can also include a guide roller and brush assembly to facilitate feeding of web from any of the stacks located on the cart.

Figure 20:
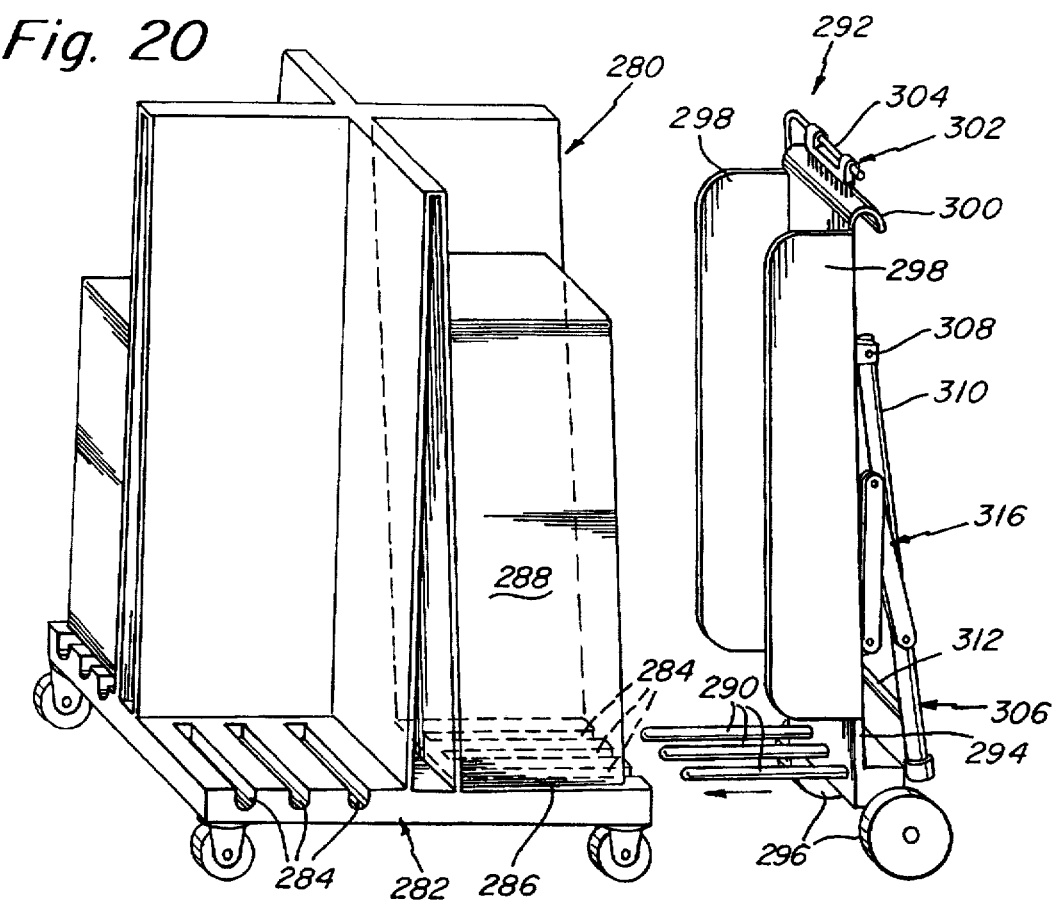
FIG. 20 is an alternate embodiment of a cart having grooves in the base for receiving fingers of a stack transport dolly or ejector according to this invention.

FIG. 20 illustrates another cart and dolly embodiment according to this invention in which the cart 280 includes a base 282 having three rounded channels 284 that extend perpendicularly to an edge of the base 282 in each quadrant. It is contemplated that, like the embodiment of FIGS. 18 and 19, the channels 284 can extend from both edges of the base 282 in a quadrant. Similarly, the channels 284 can be rectangular rather than rounded. The channels 284 are sized so that the bottom 286 of a stack 288 of web material does not bow substantially into the channels. In this embodiment, three channels that extend substantially the entire length of the quadrant, and that are approximately 1-2 inches in width, are utilized. In this embodiment, as well as the preceding embodiment, more or fewer channels can be utilized.

The channels 284 receive corresponding fork-like tines or fingers 290 of a stack ejector or dolly 292. The fingers 290 are mounted to a frame that comprises an upright backing surface 294 having a pair of wheels 296 at its lower end. The dolly 292 according to this embodiment further includes a pair of side walls 298 that assist in maintaining a stack such as stack 288 within the dolly. The upper end of the dolly 292 includes a curved handle 300 that, in this embodiment, is formed as an extension of the backing surface 294. An auxiliary handle formed, for example, from a tube or other structural member can be utilized according to this embodiment. The handle 300 curves downwardly to form an integral web guide and includes an overlying pivoting brush 302 mounted on a bracket 304. The brush 302 is positioned so that it contacts an upper surface of the handle 300.

Figure 21:
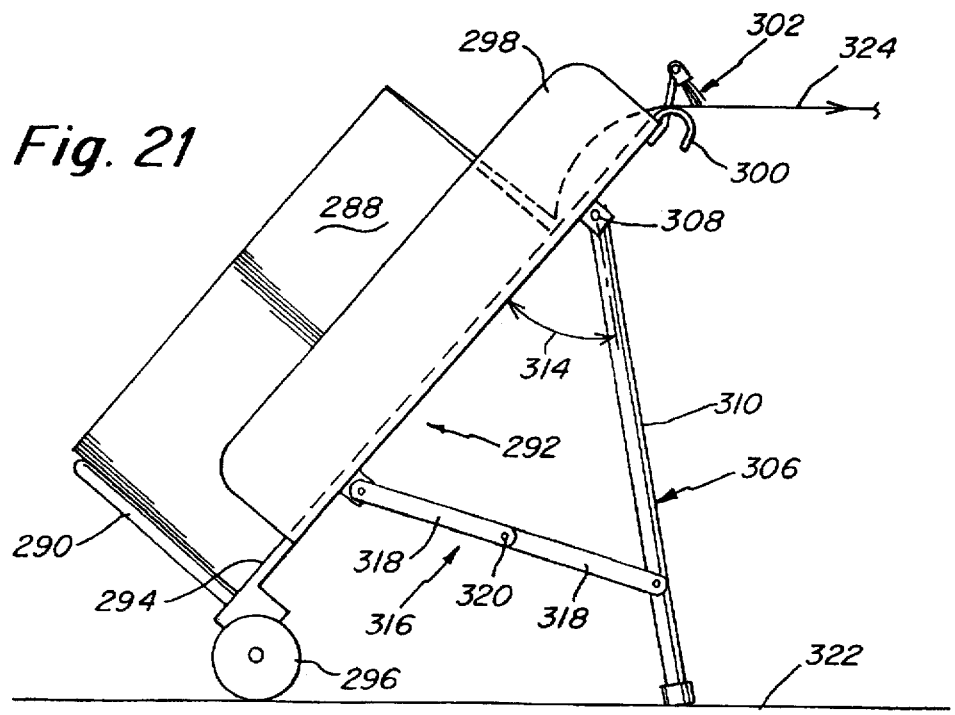
FIG. 21 is a side view of the feeding of a stack located on the dolly of FIG. 20.

As further detailed in FIG. 21, the dolly 292 also includes a stand 306 that moves on a pivot 308, located adjacent in upper end of the backing support 294. The stand 306 comprises a pair of support legs 310 joined by a cross brace 312. The legs 310 pivot outwardly from the backing surface 294 to an angle 314 that is limited by a scissor-like link 316 pivotally joined between a lower end of the backing support 294 and a lower end of each leg 310. The link 316 forms a pair of link sections 318 that pivot relative to each other at a central pivot point 320. A variety of comparable structures can be utilized to limit outward pivoting of the legs 310 according to this embodiment. Such structures include a chain (not shown) joined between the backing support in the legs or a pneumatic or hydraulic cylinder (not shown) joined between the backing support 294 and the legs 310.

With the legs 310 located in an outwardly deployed position, as shown in FIGS. 21, the backing surface 294 is disposed at a nonperpendicular angle relative to the floor surface 322. In this position, the stack 288 of folded web material rests at an angle relative to the floor surface 322 and is readily fed from the dolly 292 to a remote utilization device (not shown). As noted, the handle 300 and brush 302 serve as feeding guides when the dolly is deployed as shown. Web 324 passes over the handle 300 in contact with the brush 302 substantially free of undue slack.

Another dolly and cart system is depicted in the embodiment of FIGS. 22–25. The cart 340 according to this embodiment is similar in design to the other carts described hereinabove. It includes four walls 342 defining four corresponding quadrants and a base 344 having caster wheels 346 at the four corners thereof. Other improvements described hereinabove, such as floor locking mechanisms or feed rollers located at the top of the cart can also be included and are expressly contemplated.

The stack 348 of folded web material depicted in FIG. 22 is located on a channel-shaped supporting surface 350 that, itself, rests on the base 344. The channel structure according to this embodiment includes a pair of upright walls 352 that engage the cart base 344 and a suspended support base 354 that defines a plane substantially parallel to the cart base 344. It is contemplated that a variety of supporting structures can be utilized including those with a multiplicity of channels separated by alternating upright wall structures. In addition, a cart having built-in channel structures can also be utilized according to this embodiment. If such a cart is utilized, the corresponding stack ejector or dolly should be modified to include "fingers" that correspond to the cart's channels. Thus, the particular structure shown for the dolly 356 in this embodiment should be taken only by way of example.

In this embodiment, the stack ejector or dolly 356 includes a single stack support 358 comprising a substantially planar steel plate sized to pass (arrow 362 in FIG. 22) into the channel 360 defined by the channel-shaped stack supporting surface 350. The dolly stack support 358 is fixedly mounted to an upright frame 366 that, in this embodiment, comprises a U-shaped steel tube joined by a series of cross braces 367, 368, 370 and 372. A handle 374 is mounted between the cross brace 370 and the upper end 376 of the frame 366. A pair of wheels 378 are located adjacent a bottom end of the frame 366 opposite the stack support 358. The wheels 378 are mounted on a pair of triangular braces 380 joined between the central cross brace 368 and the lowermost cross brace 367. Outwardly of the braces 380 is located a pair of stand legs 382 that are joined to the frame 366 adjacent the cross brace 370 and that are maintained outwardly of the braces 380 by a pair of stanchions 384 mounted between lower ends of the stand legs 382 and the braces 380. The stand legs 382 are fixed in position according to this embodiment but can be pivotally mounted like those of the embodiments of FIGS. 20 and 21. The length of the stand legs 382 is chosen so that when the frame stands upright as shown in FIGS. 22 and 24, the legs are suspended above the floor surface 388 (FIGS. 23 and 24) and out of contact therewith.

Figure 25:
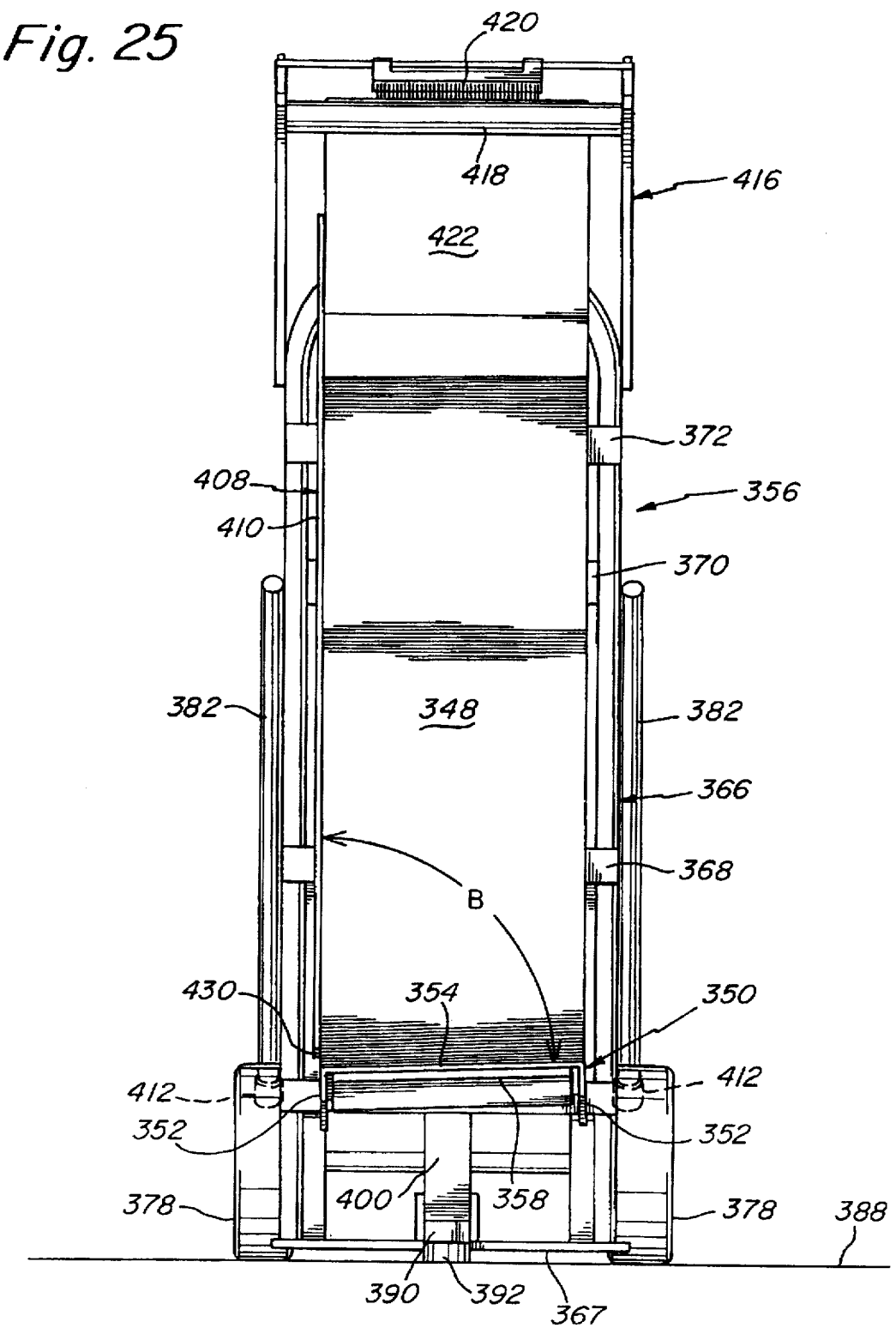
FIG. 25 is a front view of the dolly taken along line 25—25 of FIG. 24.

To further stabilize the dolly 356 in a substantially vertical standing or upright position (as shown in FIGS. 24 and 25) a leg 390 is pivotally mounted to the lowermost cross brace 367. The leg 390 includes a pad 392 constructed of an elastomeric friction-producing compound such as rubber of polyurethane. The pad 392 engages the floor surface 388 when the dolly is located in a substantially vertical upright position and, thus, serves to maintain the dolly 356 laterally on the floor.

FIG. 24 shows the stack ejector or dolly 356 in an upright position with the pad 392 engaging the floor surface 388. As further detailed in FIG. 23, the dolly 356 is movable between an angled position in which the stand legs 382 engage the floor 388 and a substantially vertical upright position (shown in Phantom) in which the stand legs 382 are suspended above the floor surface. The horizontally-extended leg 390 pivots relative to the frame of the dolly 356 and, thus, as shown, is movable to remain substantially horizontally position relative to the floor (free of interference with rotation of the dolly) throughout rotation (arrow 394) of the dolly between an upright and tilted position.

As further detailed in FIG. 24, the dolly 356 includes a latch 396 with a hook end 398 that engages an upper section 400 of the horizontal leg. The latch 396 prevents further rotation of the leg 390 toward the backing support 358 and, thus, ensures that the dolly rests on the leg against the floor 388. The latch 396 is raised and lowered on its pivot 402 by an interconnected linkage 404 having a knob 406 adjacent an upper end of the stand legs 382. A user pulls on the knob 406 upwardly (arrow 407 in FIG. 22) in order to disengage the latch 396. The linkage 404 and/or the latch 396 can include a spring (not shown) that normally biases the latch into engagement with the upper section 400 of the leg 390.

The dolly 356 further includes a backing surface 408 that defines at least one side wall 410 to be described further below. As detailed in FIG. 23, the dolly 356 in FIGS. 22 and 23 is loaded in a manner similarly to those described hereinabove. The dolly 356 is moved forwardly, with the leg 390 out of engagement with the floor surface 388 (e.g. unlatched) so that the stack support 358 underrides the channel-shaped supporting surface 350 as shown in Phantom in FIG. 23. Note that the use of a channel-shaped supporting surface is illustrative only and the stack support 358 can comprise fingers that directly contact a stack bottom according to the invention. The stack 348 is then lifted from the cart 340 by tilting back (arrow 394) on the dolly 356 using, for example, the handle 374 so that the dolly 356 rotates about its wheels. The dolly 356, in a tilted orientation (with stand legs 382 and leg 390 out of contact with the floor surface 388), can be wheeled to another remote location. Alternatively, as shown in FIGS. 23 and 24, the dolly 356 can be rested upon its stand legs 382 and laterally secured by the friction-producing rubber feet 412 at the ends of the legs 382.

The dolly 356, according to this embodiment, further includes an angled support bracket 416 that extends upwardly from an upper end of the frame 366. The bracket 416 supports a web guide roller 418 and pivoting brush 420 that is similar to those described hereinabove. As detailed in FIG. 24, the roller 418 and brush 420 serve as guides to direct web 422 from the stack 348 to a remote location such as a utilization device. The web can be fed in either of two directions (arrows 424 and 426 by changing the side upon which web passes over the roller 418). The brush 420 pivots to follow the prevailing web movement direction. It is contemplated that web feeding can occur in either of two orientations; either with the dolly 356 resting on its stand legs 382 (FIG. 23) or supported in a substantially vertical position on the leg 390 (FIGS. 24 and 25).

The dolly stack support 358, according to this invention, is disposed at an acute angle A relative to the frame 366 and backing support 408. The angle A insures that, in an upright position (FIG. 24), the stack 348 is firmly maintained against the dolly backing surface 408. The angle A is typically between approximately 75 and 88 degrees, but it can be greater or lesser than this value. An additional rearward slant to the stack is imparted by the latched leg 390. Hence, the stack 348 is firmly held by the dolly 356 in this position. Since the stack support 358 is angled, the dolly 356 must be tilted slightly forwardly (see FIG. 23 in phantom) to place the stack support 358 into a substantially parallel position relative to the floor surface 388, thus allowing the backing support to slide under the support structure 350.

Additionally, the side wall 410 of the backing surface 408 is located on only one side of the dolly 356. This arrangement assists in enabling the stacking of wider web material and facilitates the transfer of web material onto the dolly 356 when the stack may include uneven folds that would bind up on a pair of closely spaced side walls. As detailed in FIG. 25, in order to insure that the stack 348 is retained within the dolly 356, the stack support 358 is also disposed at an acute angle B relative to the vertically-disposed side wall 410. This angle, again, is between 75 and 88 degrees, but other angles are expressly contemplated. The angle B ensures a cant in the stack 348 that retains it against the side wall 410.

While only one side wall 410 is utilized according to this embodiment, it is contemplated that two side walls can be utilized according to this invention. With either one or two side walls, the wall's bottom edges 430 should be spaced sufficiently from the backing surface to allow the channel-shaped supporting surface 350 to pass between side wall 410 and the backing surface 358.

Figure 26:
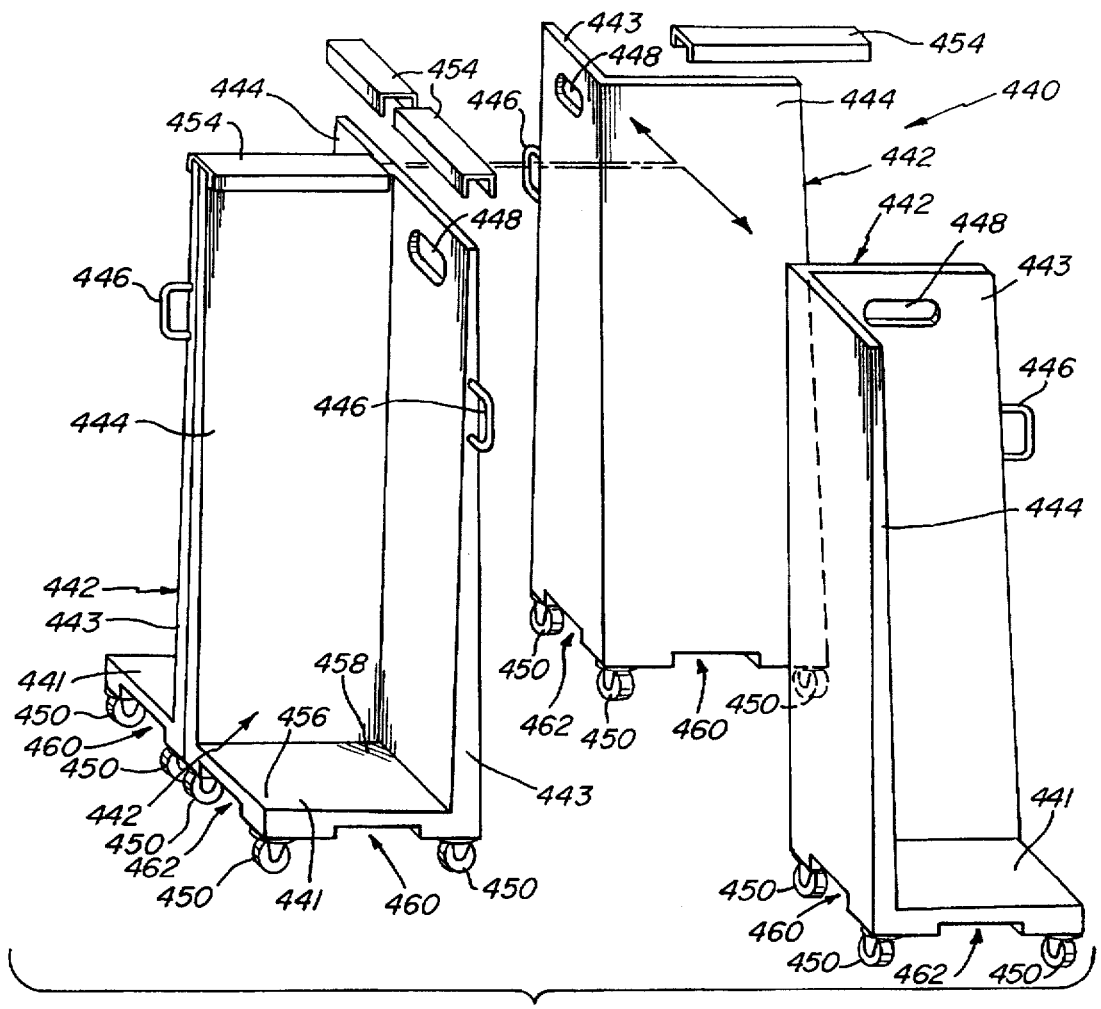
FIG. 26 is an exploded perspective view of an alternate embodiment of a multisectioned cart system according to this invention.
Figure 27:
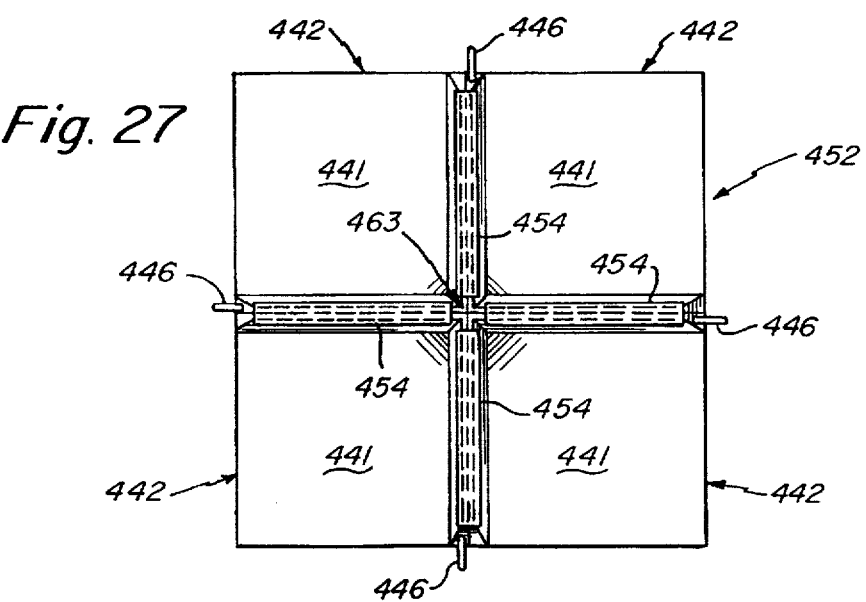
FIG. 27 is a top view of the cart system of FIG. 26 in interconnected form.

A novel cart structure 440 is depicted in FIGS. 26 and 27. The cart structure comprises, in this embodiment, four discrete cart sections 442 that can be, essentially, identical. The sections, 442, according to this embodiment, each include a base 441 defining and an approximate square and a pair of perpendicular side walls 443 and 444. Each of the cart sections 442 include, along at least one wall 443, a handle 446 and/or through-cut hand hold 448. It is contemplated that any number of gripping and holding structures can be provided to each cart section 442. The cart sections 442 include caster wheels 450 along their base 441. The caster wheels 450 rotate freely so that each cart section can be maneuvered laterally independent of the others. It is contemplated that more or fewer than four wheels can be provided to each cart. For example, each cart section 442 can include only two wheels (not shown) and be moved about in the manner of a dolly.

The cart sections 442 are constructed so that four individual sections 442 can be joined together to form a single, four quadrant, cart that is arranged substantially similarly to those described hereinabove. Such a four quadrant cart assembly 452 is shown in top view in FIG. 27. The cart sections 442, according to this embodiment, are joined by channel brackets 454 that lock the tops of the cart walls 443 and 444 into a joined relationship. It is contemplated that any number of cart section latching mechanisms can be utilized. For example, a system of interlocking pins and holes can be positioned between each cart section. Similarly, luggage-type latches can be provided between each of the cart sections. Such latches could be positioned along the sides of the walls 443 and 444 and/or adjacent the wall tops and the base 441.

The base 441 of each cart section 442 is angled downwardly from an outermost corner 456 to an innermost corner 458. Thus, like the other cart embodiments described herein, each cart section biases a stack thereon (not shown) toward the walls 443 and 444. When the cart sections 442 are assembled into a complete four quadrant unit 452, each of the four bases 441 is angled inwardly toward the common center 463 like other cart embodiments described herein.

Figure 28:
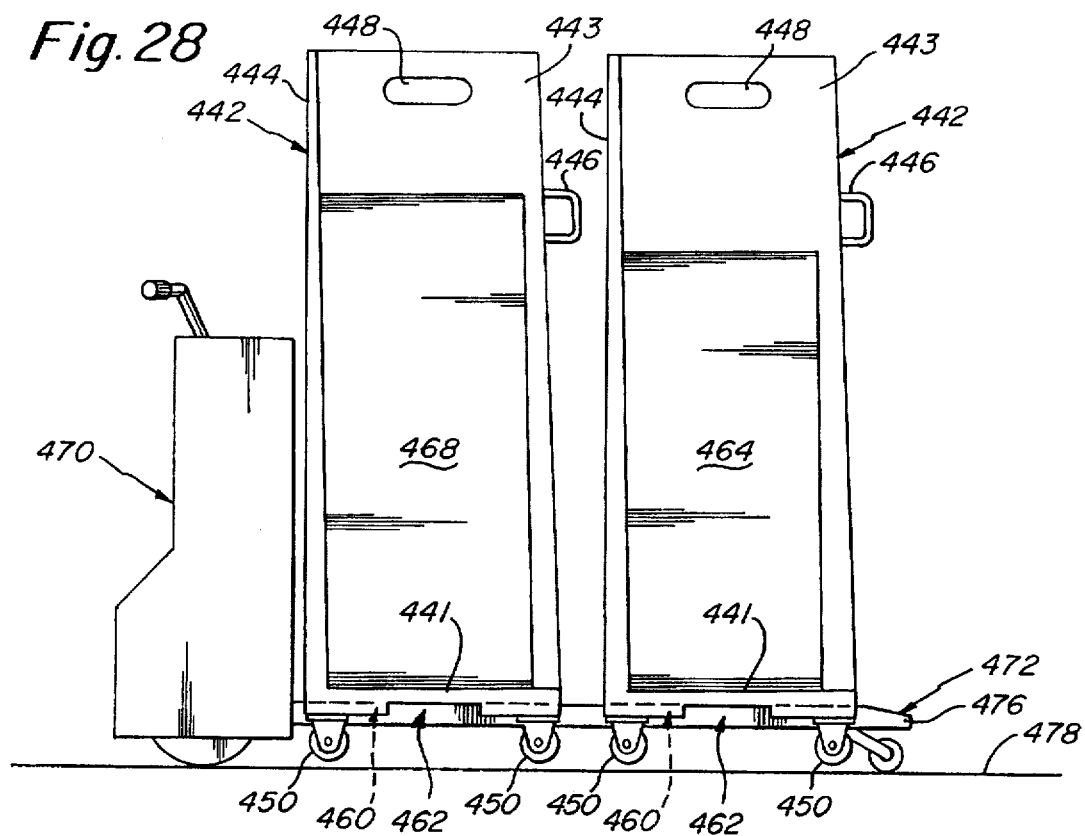
FIG. 28 is a side view of loaded cart sections according to the embodiment of FIG. 26 mounted on a pallet jack.
Figure 29:
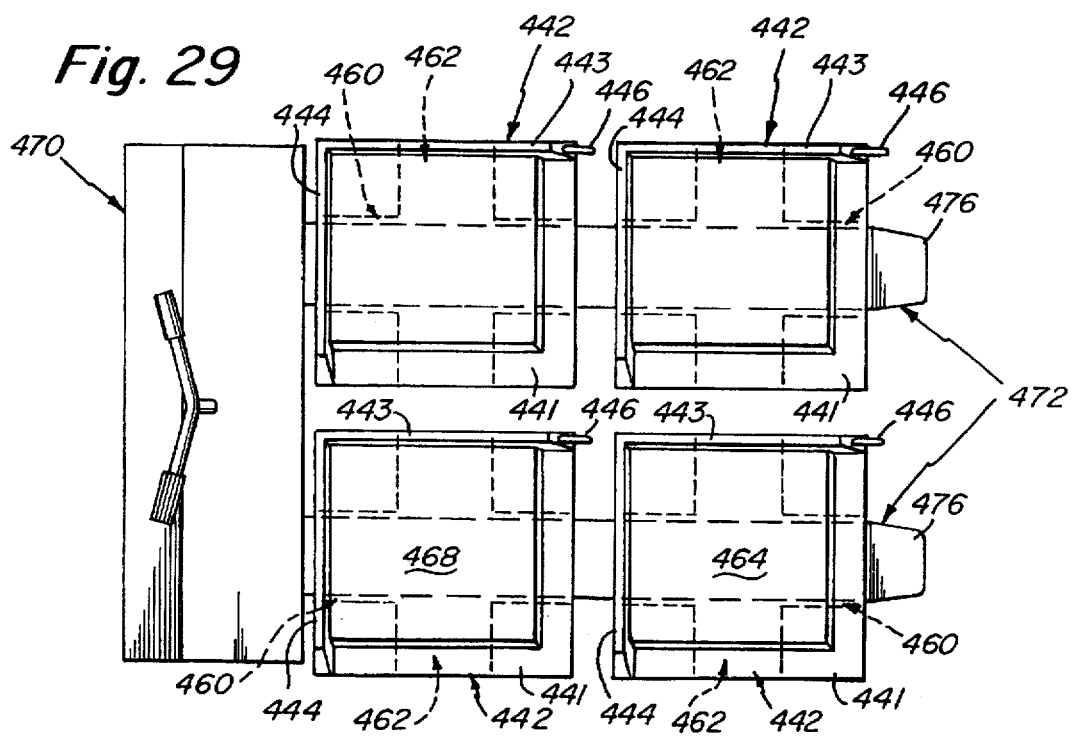
FIG. 29 is a top view of the cart sections and pallet jack of FIG. 28.

The cart section base 441, along a bottom surface thereof also include a pair of perpendicular channels 460 and 462. As further detailed in FIG. 28, the channels 460 and 462 enable the cart sections 442 (shown with loaded stacks 464 and 468 therein) to be carried on a wheeled pallet jack 470 having a fork structure 472 of substantially conventional design. The channels 460 are sized to receive a respective tine 476 of the pallet jack fork structure 472. A conventional pallet jack or, forklift, can carry as many as four cart sections 442 at once.

Since each cart section 442, according to this embodiment, includes perpendicularly crossing channels 460 and 462, respectively, the cart section can be loaded on the tine 476 in either of two perpendicular orientations. The weight of the stack 464 and 468 should be sufficient to maintain the cart section 442 balanced on the tine 476. The tines 476 need only be raised a small distance off the floor to carry the cart sections, and thus, if tipping of a cart sections 442 occurs, the cart section wheels 450 should contact the floor surface 478 before the stack falls from the cart section 442.

It is contemplated that cart sections 442 according to this embodiment can be assembled into carts that are smaller than four quadrants. For example, a two or three quadrant cart can be formed and used according to this embodiment. In addition, a roller and brush guide can be positioned over one or more of the cart sections to assist in guiding web from a given cart section downstream to a utilization device.

Similarly, a cart having more than four cart sections can be formed for transport of high volumes of web material stacks at once to a processing location. Additionally, car sections can be loaded or unloaded as separate units and brought together as an assembled group during, for example, transport or storage.

Figure 30:
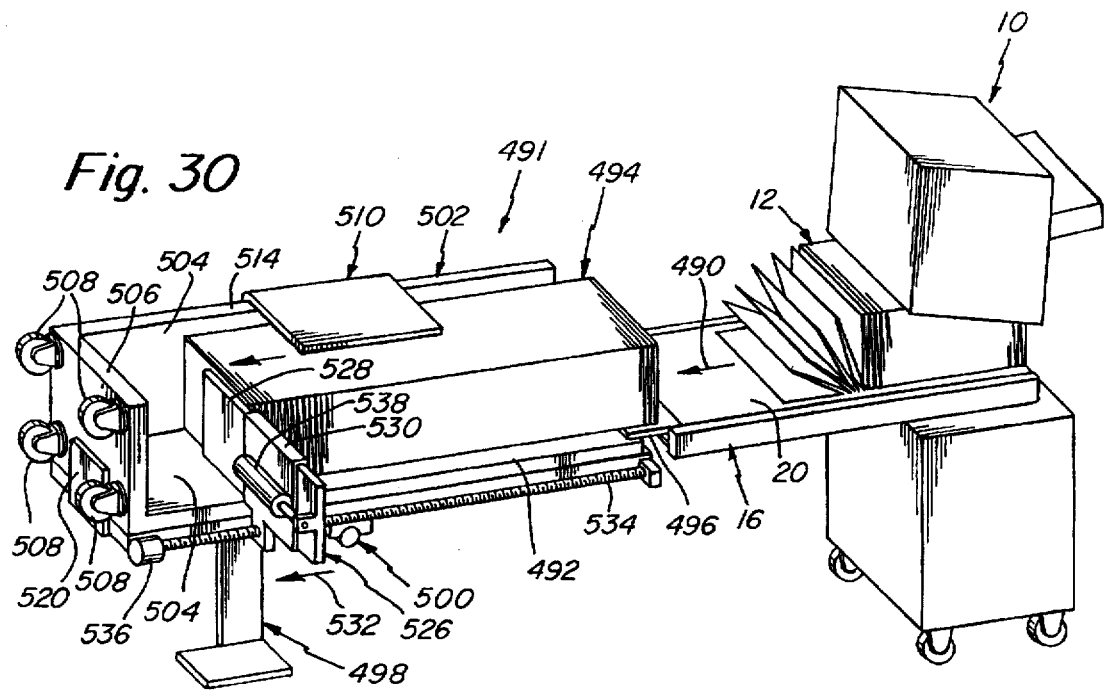
FIG. 30 is a perspective view of an alternate embodiment of the folder, conveyor and tilting table according to this invention.
Figure 31:
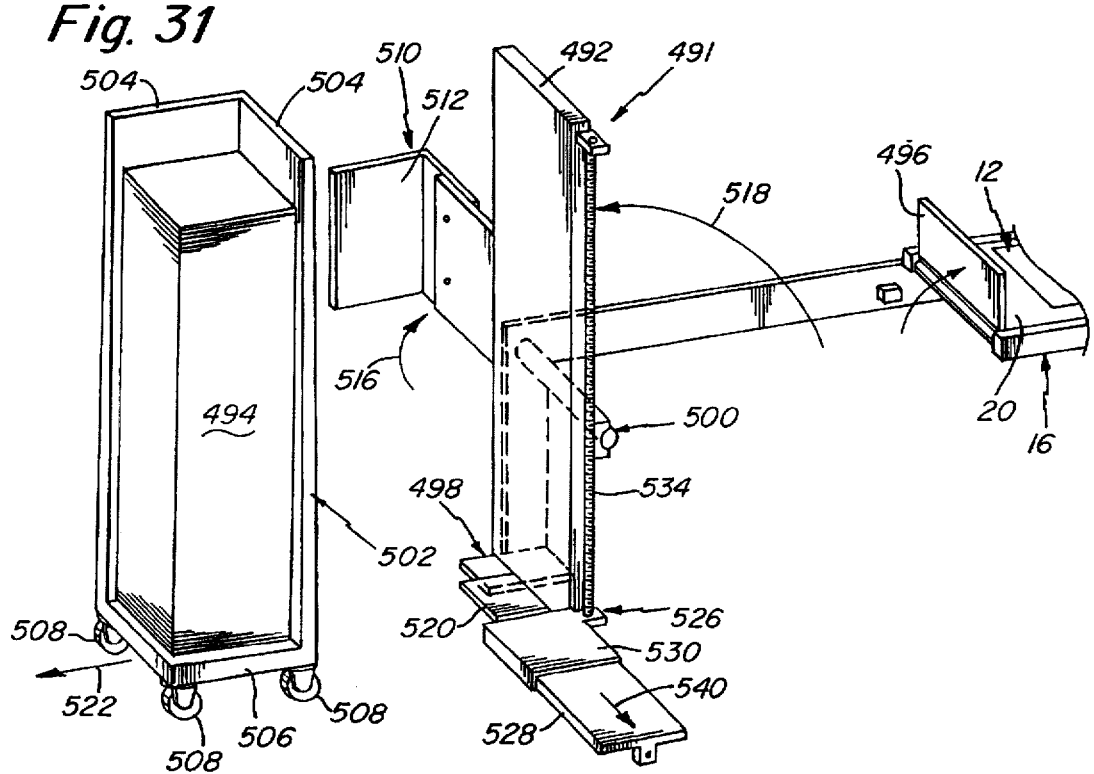
FIG. 31 is a perspective view of the table of FIG. 30 located into a vertical orientation to unload a stack onto a cart.
Figure 32:
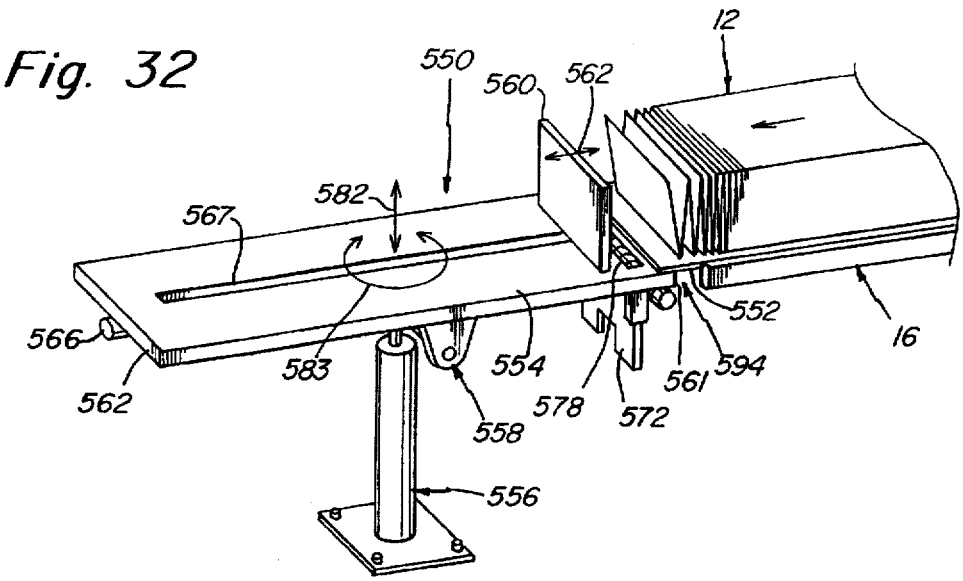
FIG. 32 is a perspective view of another alternate embodiment of the tilting table according to this invention including a multidirectional pivot mechanism and moving backing support with support straps.

Another embodiment of a tilting table and conveyor construction is detailed in FIGS. 30-31. A folder and separator 10 of the type described hereinabove is provided. Folder and separator 10 generates a stack of zig-zag or fan-folded web or forms 12 that are directed downstream (arrow 490) on a conveyor 16 that includes a conveyor belt or belts 20. The web 12 is directed onto a table unit 491 including a tilting support surface or table top 492 according to this embodiment, wherein it is formed into a horizontally-extending stack 494. According to this embodiment, a pivoting flap 496 is provided between the conveyor 16 and the table top 492. The flap 496 pivots in a manner similarly to the flap 50 of FIG. 1 (see FIG. 3) to form a stop blocking further advance of web 12 while the table top support surface 492 is rotated. The flap 496 is optional and can be omitted in instances where the table top 492 is positioned, relative to the conveyor 16, to enable the stack to pass between the conveyor 16 and the table top 492 without becoming jammed into a gap therebetween. The table top 492 is pivotally mounted on a base 498 having a pivot bracket 500 and rotates in a manner similarly to the table top 24 of FIG. 1.

Unlike the preceding embodiment, the table top 492 according to this embodiment, supports a complete cart 502 having walls 504 and a base 506 that define a single quadrant similar to the cart sections 442 described in FIGS. 25-29. The cart base 506 includes wheels 508 that project in a downstream direction. One of the cart walls 504 rests on the table top 492 and provides a surface upon which the horizontal stack 494 is formed. The table top support surface 492, according to this embodiment, can be located at an elevation (relative to the conveyor 16) so that the wall 504 is substantially flush with a surface of the conveyor 16. Alternatively, the flap 496 can bridge the step in height between the conveyor 16 and the wall 504. In this instance, the flap would be angled upwardly in an upstream-to-downstream direction. The walls 504 of this cart, as well as other carts described herein, can be constructed from a polished or semipolished metal, such as stainless steel, to facilitate sliding of the web onto and off of the cart wall. The base can, similarly, be constructed with low friction materials or coverings.

The table top 492 includes a pivotally mounted hold-down clamp or bracket 510 that includes, as detailed in FIG. 31, and L-shaped plate 512 that projects over a top of the stack. The plate 512, according to this embodiment, also engages an edge 514 of the wall 504 of the cart 502. The bracket 510, thus, retains the cart 502 securely against the table top 492. The bracket 510 pivots (arrow 516 in FIG. 31) between a position overlying the stack 494 (FIG. 30) and a position in which the plate 512 is located outwardly of, and free of engagement with the stack 494 and the cart edge 514. The plate 512 assists in retaining the stack 494 against the cart wall 502 as the table top 492 pivots (arrow 518 in FIG. 31) to a substantially-vertical orientation. As noted above, the plate also serves to retain the cart 502 against the table top 492 during pivoting. The table top 492 further includes a downstreammost positioned stop 520 that restricts further downstream movement of the cart 502 (in a horizontal orientation) relative to the table top 492. The stop 520 according to this embodiment can comprise a sturdy steel plate welded or otherwise secured to the downstream end of the table top support surface 492.

The table top 492 is located on its pivot bracket 500 so that tilting of the table top 492 (arrow 518) into a substantially-vertical orientation (FIG. 31) places the wheels 508 into engagement with the floor surface. The stop 520 can be positioned on the table top 492 so that, in a substantially vertical orientation, at least some of the wheels 508 contact the floor and enable the cart 502 to be rolled away from the table top support surface 492 (arrow 522 in FIG. 31) as shown. The location of the stop 520 can be such that rotation of the table top 492 through the final few degrees, into a substantially vertical orientation, the cart wheels 508 contact the floor surface and the bottom of the cart base 506 becomes separated from the stop 520. The table top 492 continues to tilt as the cart wheels 508 engage the floor surface until the stop is fully out of contact with the base 506. The hold-down bracket 510 can be pivoted out of engagement with the cart 502 to enable the cart 502 to roll away from the table top 492.

An improvement to the table 437 according to this embodiment, is the addition of a horizontally-moving back stop 526. The back stop 526 according to this embodiment, comprises a backing plate 528 mounted on a support bracket 530. The support bracket 530 moves in an upstream and downstream direction in response to rotation of a screw 534 driven by a drive 536. The drive, according to this embodiment, can be interconnected with a screw that rotates, as shown or, alternatively, the screw can remain stationary and the drive can be positioned on the backing support 530 and rotate a threaded nut or lug thereon. Similarly, other linear drive mechanisms are contemplated according to this invention including rack and pinion systems and linear actuators.

The drive 536 receives signals from a sensor located on the table top support surface 492 (not shown, see, for example, sensor 660 of FIG. 37) or, alternatively, based upon control signals issued by the folder and separator 10 or another upstream web processing component. In response to the signals, the drive 536 moves the back stop 526 downstream (arrow 532) as the stack 494 grows. Hence, the stack 494 is maintained in a substantially continuously compressed stack 494.

Since this embodiment contemplates the use of a cart 502 mounted directly on the table top 492, the backing plate 528 should be movable out of engagement with the cart 502. Thus, the cart 502 is free to move away from the table top 492 when it is positioned in the substantially-vertical position. The support bracket 530 is provided with a linear actuator 538 that, to unload of the cart 502 from the table top 492, moves the backing plate 528 sideways (arrow 540 in FIG. 31) to locate the backing plate out of interfering engagement with the cart 502.

In operation, the back stop 526 is located near an upstream end of the table top 492. Web 12 is driven onto the cart wall 504. As a stack 494 forms, the drive 536 is instructed to move the backing support 526 downstream to accommodate the growing stack 494. Once the stack 494 is completed, an operator, or an automatic sensor, halts the folder and separator unit, and/or alternatively, raises the flap 496 (which can be driven automatically) to block further passage of web 12 onto the table top 492. The table top 492 is then tilted (arrow 518) into a substantially-vertical orientation, wherein the cart wheels 508 contact a floor surface and the cart is lifted away from the stop 520. The pivoting hold-down bracket 510 is pivoted (arrow 516) away from the stack 494 and cart 502 and the backing plate 528 is moved sideways (arrow 540) to allow the stack 494 to engage the base 504 of the cart 502. The cart 502 is then rolled away (arrow 522) from the table top 492 and a new empty cart (not shown) is located on the table top 492 and rotated into a horizontal orientation as shown in FIG. 30 to receive a new stack of web.

Note that the backing plate 528 can be moved sideways either before or after tilting of the table top 492 from the substantially-horizontal orientation into the substantially-vertical orientation. Generally, less force is required to move the backing plate sideways before the full weight of the stack 494 bears upon the backing plate 528 in the substantially vertical orientation. The backing plate 528 can move sideways automatically, or alternatively, can be manually moved out of engagement with the stack 494. Similarly, while sideways movement is shown and described, any form of movement that relocates the backing plate out of engagement with the downstream end of the stack 494 is contemplated. Similarly, while a powered drive 536 is utilized to move the back stop 526 downstream according to this embodiment, it is contemplated that a spring-loaded back stop that follows the growth of the stack, can be utilized according to this invention. Such a back stop can return to an upstreammost position following unloading of the stack from the table top. In addition, the table top 492, according to this embodiment can be adapted to receive a stack of web discretely thereon without a cart located on the table top 492. The web stack can be supported directly on the backing plate 528 for transfer onto an adjacent cart in a substantially-vertical orientation.

FIGS. 32–36 illustrate another embodiment of a tilting table structure 550 according to this invention. The table 550, according to this embodiment, receives web 12 from a conveyor 16. The conveyor 16, according to this embodiment, is provided with a flap 552 similar in construction to those described hereinabove. The table 550 according to this embodiment includes a table top 554 that is pivotally supported on a base 556 by a bracket assembly 558. As further detailed in FIG. 33, the bracket assembly 558 enables the table top 554 to pivot from a substantially horizontal position to a substantially-vertical position (shown in Phantom). The table top 554, according to this embodiment, directly receives web 12 from the conveyor 16. A backing plate 560 moves in an upstream and downstream direction (double arrow 562 in FIG. 32) in response the growth of a stack located on the table top 554. The backing plate 560 is driven by a rotating screw 564 (FIG. 33) interconnected with a drive 566. In this embodiment, the plate 560 is interconnected with a lug 568 (FIG. 33) that extends through a slot 567 centrally located in an upstream-to-downstream alignment along the table top 554. The lug 568 is threaded and engages the screw 564. As described above, with reference to the preceding embodiment, a variety of backing plate linear drive mechanisms (and locations therefor) are expressly contemplated.

Figure 33:
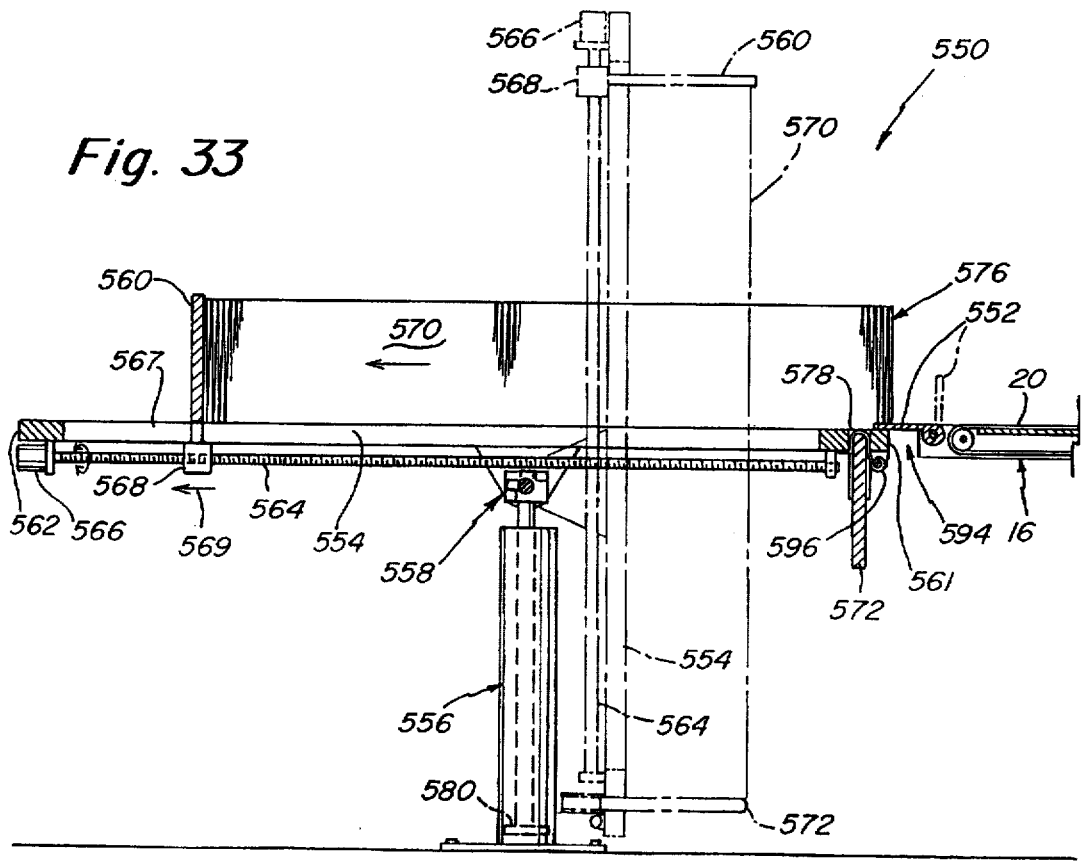
FIG. 33 is a partially broken-away side view of the table of FIG. 32 detailing the positioning of the table into a substantially vertical position, shown in phantom.

As detailed in FIG. 33, the backing plate 560 moves downstream (arrow 569) as a stack 570 is formed on the table top support surface 554. The backing plate drive 566 is controlled by a sensor (not shown) or by signals sent from an upstream processing device (not shown). When formation of a stack is completed, an upstream backing support or door 572 is moved into position in front of an upstreammost end 576 of the stack 570. The stack 570 is, thus, contained at both ends—by the moving backing plate 560 at the downstream position and at the upstream position by backing support 572. According to this embodiment, the upstream backing support 572 can comprise a door that moves through a slot 578 into engagement with the upstream end 576 of the stack, or alternatively, can comprise another form of stack-engaging backing support. The table top 554 is rotated on its bracket 558 into a substantially-vertical orientation (shown in Phantom in FIG. 33), wherein the upstream backing support 572 supports stack 570 thereon. The stack 570 can be unloaded in this orientation, as further detailed below.

The table base 556 according to this embodiment, includes a lift piston 580 that enables the table top 554 to be raised and lowered (arrow 582 in FIG. 32) upon demand. The base 556 is further adapted so that the table top 554 can rotate (curved arrow 583) relative to the base 556. In this manner, either end 561 or 562 of the table support surface 554 can be located adjacent the conveyor 16. In order to facilitate rotation, a sufficient gap 594 should be provided between the conveyor 16 and the table top 554. This gap 594 is bridged, for example, by the flap 552. Alternatively, the table and conveyor can be constructed with corresponding curved ends similar to a railroad turntable that enable a relatively flush, flapless, fit between the conveyor and table.

Figure 34:
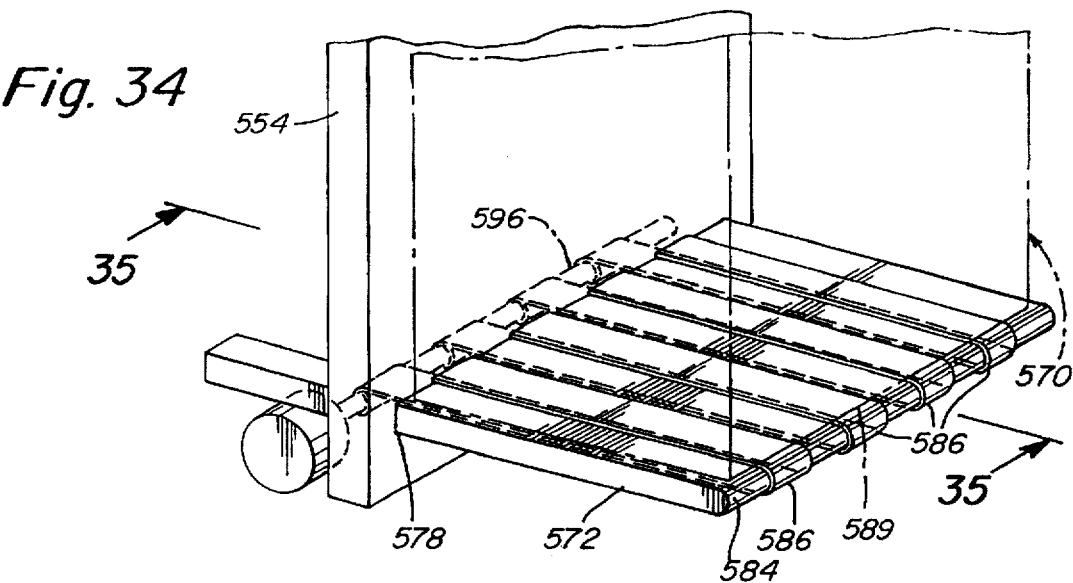
FIG. 34 is a more detailed perspective view of the backing support, including the support straps of the table of FIG. 32.
Figure 35:
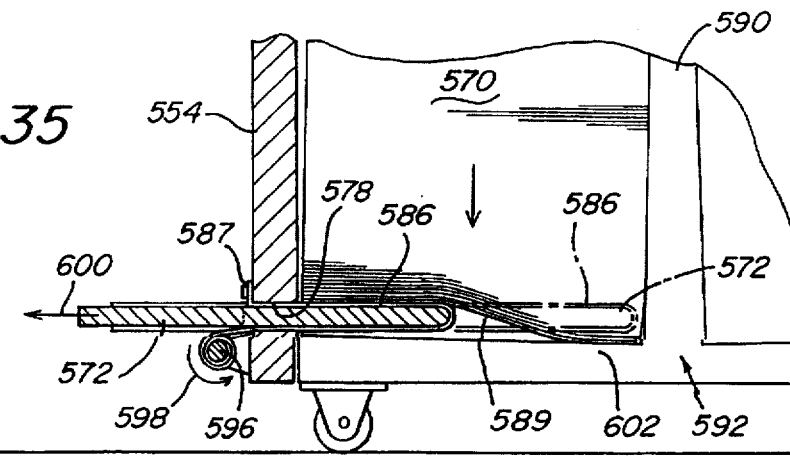
FIG. 35 is a side cross-section of the backing support of FIG. 34 detailing the unloading of a stack of web onto a cart.
Figure 36:
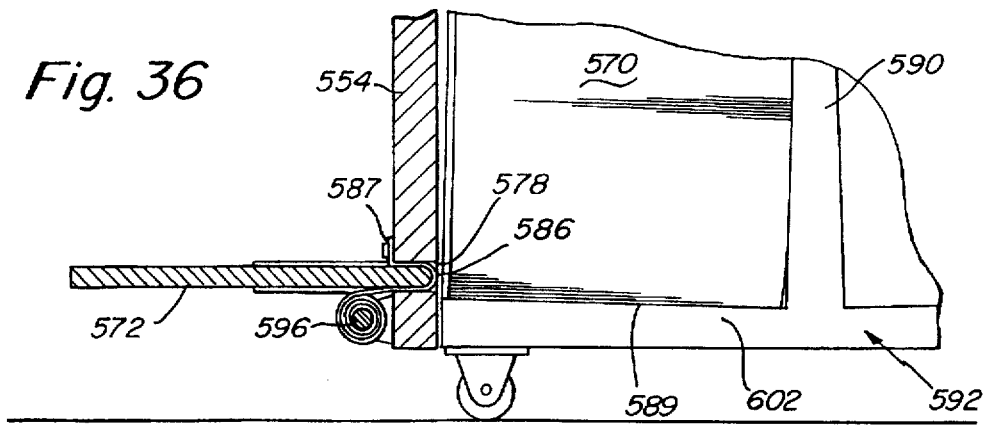
FIG. 36 is another cross-section of the backing support according to FIGS. 34 and 35 detailing the completion of the loading of a stack onto the cart.

The upstream backing support 572 is further detailed in FIGS. 34–36. The backing support or door 572 according to this embodiment, is, like other embodiments herein, preferably constructed with a low friction material or surface. The backing support includes a rounded front edge 584 and includes a plurality of belts or straps 586 that extend along the upper and lower surfaces of the support 572 and around the rounded edge 584. The straps 586 according to this embodiment, can be approximately 1–2 inches in width and are constructed, preferably, from rubber, polyurethane or another material that generates relatively high friction in contrast with web material, such as paper, but can slide with relatively low friction against a door surface. In this embodiment the door surface can comprise polished or semipolished stainless steel.

The door straps 586, according to this embodiment, assist in maintaining the stack 570 against the wall 590 of the cart 592 (FIGS. 35 and 36). The bottom 589 of the stack 570 normally rests upon the straps 586 when the backing support 572 is in an extended position and engagement with a bottom of the stack 570.

As further detailed in FIG. 35, the straps 586 are fixedly attached at one end 594 to the table top 554. At an opposing end, the straps 586 are mounted to a take-up roller 596 that, in this embodiment, can be spring-loaded so that it is rotatably biased in the direction of the arrow 598. When the table top 554 is located in a substantially-vertical orientation, adjacent the cart 592, the backing support 572 is moved away from the stack 570 (as shown by arrow 600 in FIG. 35) whereby the bottom 589 of the stack 570 is brought into contact with the base 602 of the cart 592. The straps 586 isolate the bottom of the stack 570 from the surface of the backing support 572. The take-up reel 596 removes slack in the straps from below the backing support 572 as the backing support 572 moves in the direction of the arrow 600. The upper portions of the straps 586, which contact the bottom 589 of the stack 570 remain stationary during movement of the door 572. Accordingly, the stack is laid evenly upon the base 602 of the cart 592 substantially without sliding between the bottom of the stack 570 and the backing support 572. When the backing support 572 is fully relocated out of contact with the bottom 589 of the stack 570 (FIG. 36), the straps 586 are also fully out of engagement with the bottom 589 of the stack 570 and any generated slack in the straps 586 is fully taken up by the roller 596. It is contemplated that a variety of strap engagement mechanisms can be utilized according to this invention. It is desired primarily that straps of some form be provided to the backing support in a manner that isolates the bottom of the stack 570 from the backing support and aids in disposition of the stack onto the base 602 of the cart 592. Such a backing support and straps can be utilized in any embodiment for a tilting table described herein.

Figure 37:
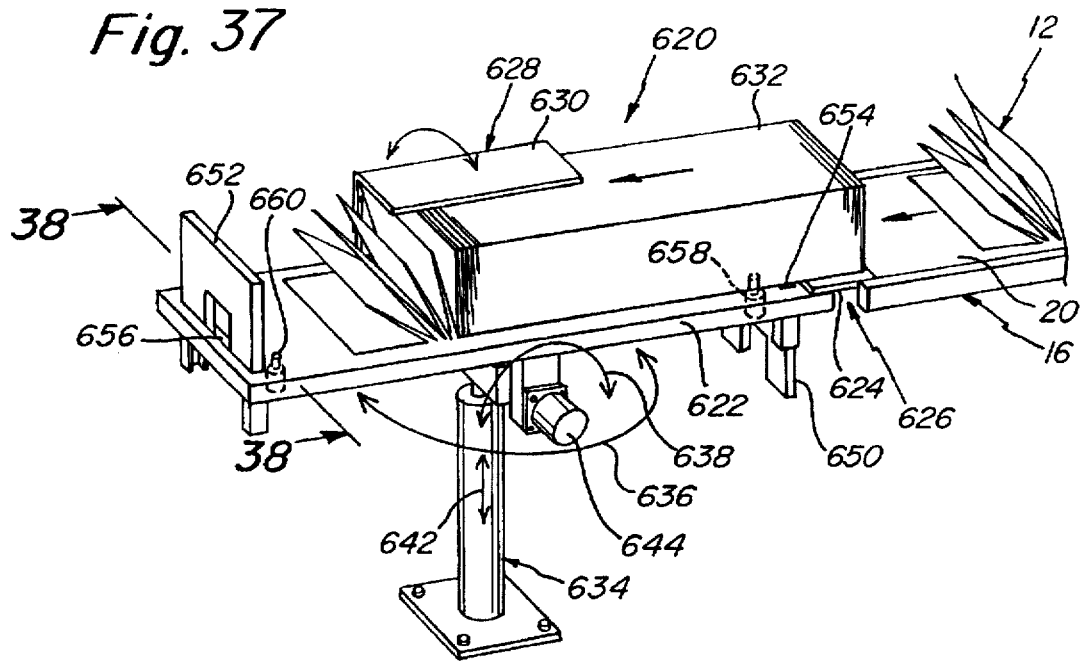
FIG. 37 is a perspective view of yet another alternate embodiment of the tilting table according to this invention including a multidirectional pivoting mechanism, upstream and downstream movable backing supports, a movable hold down bracket and a base-mounted table lift.
Figure 38:
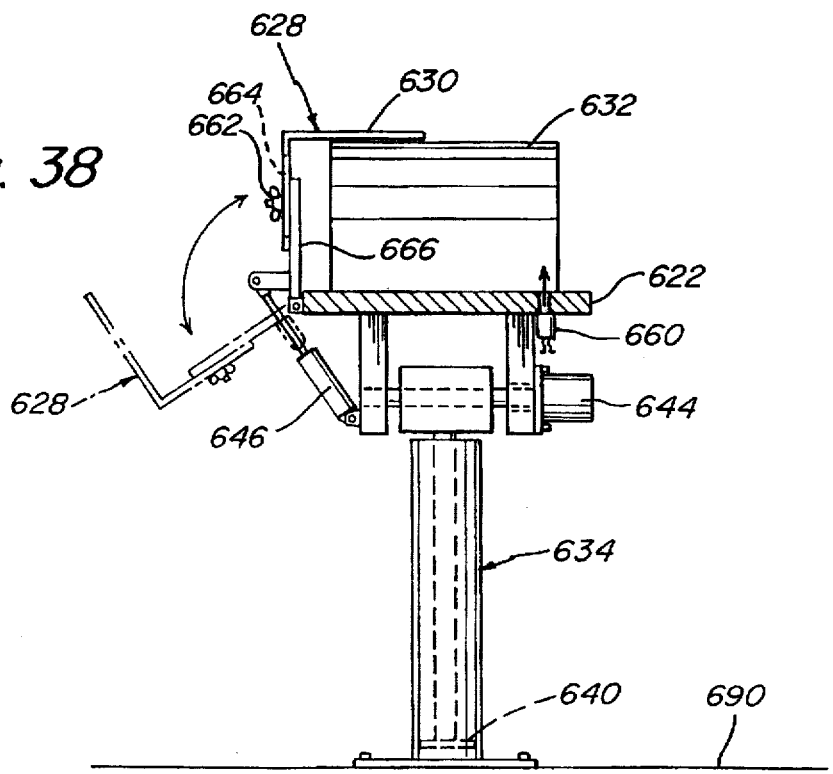
FIG. 38 is an end cross-section of the table taken along line 38—38 of FIG. 37 detailing movement of the hold down bracket.
Figure 39:
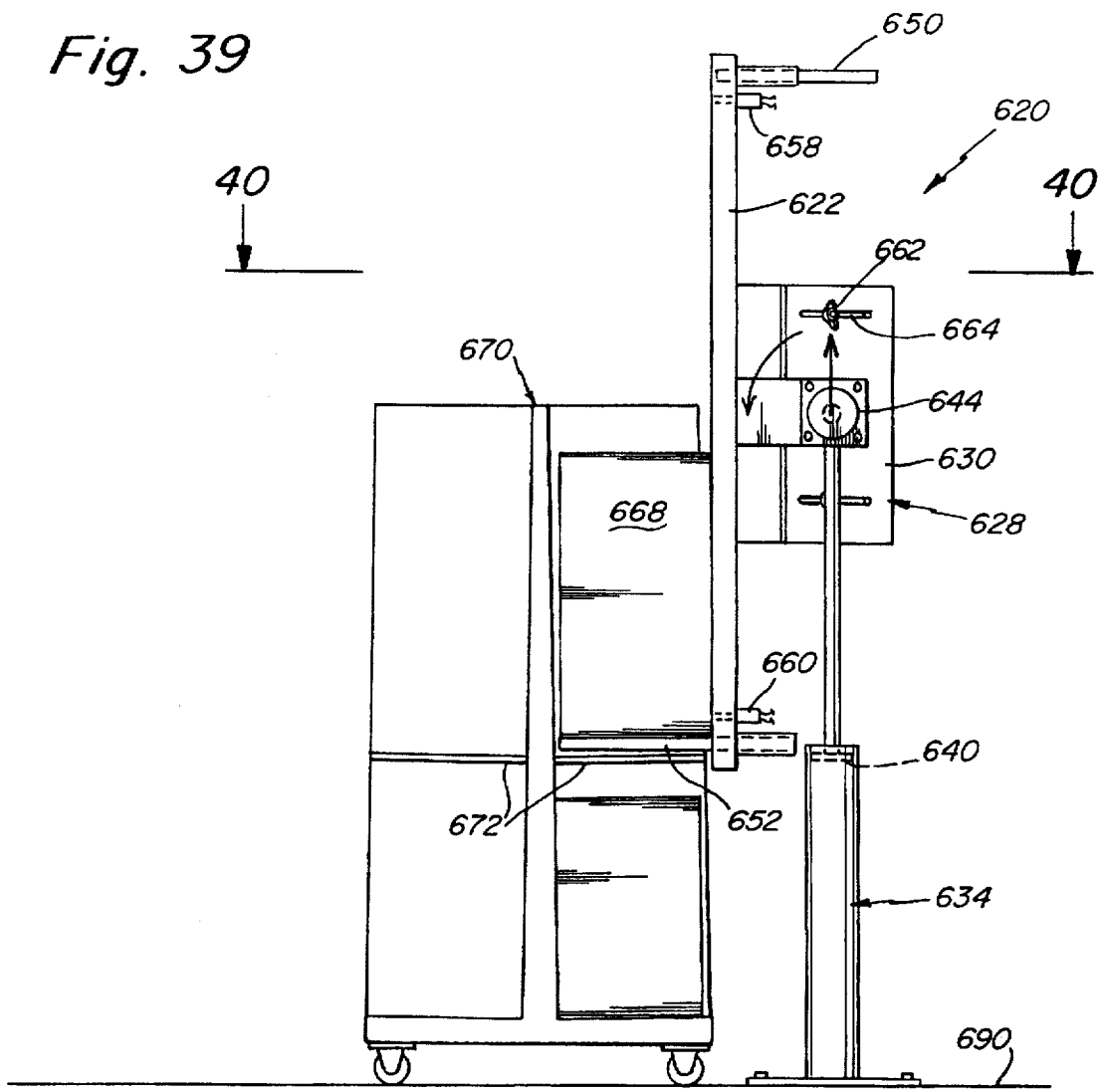
FIG. 39 is a side view of the table of FIG. 38 detailing movement of the table into a raised, substantially-vertical, orientation to deliver a stack of web material to an upper shelf on the cart.
Figure 40:
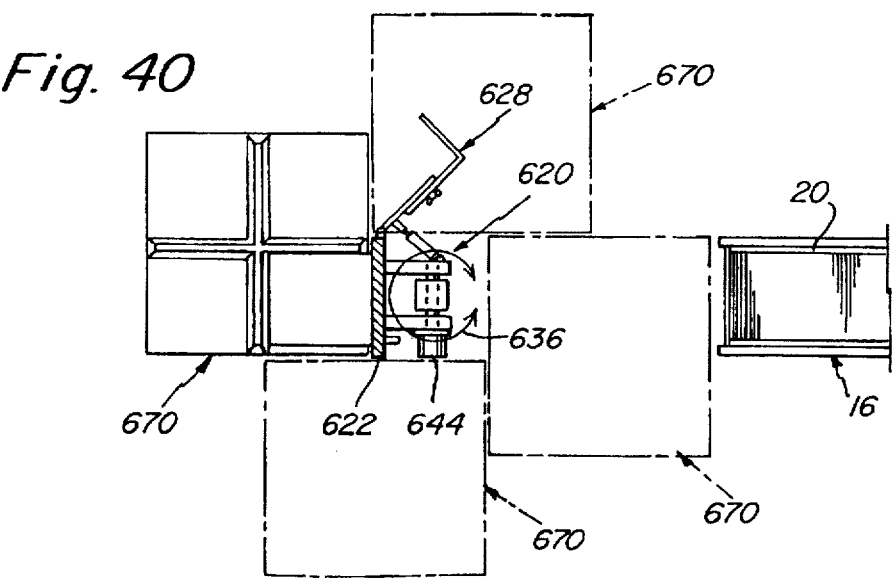
FIG. 40 is a top cross-section of the table taken along line 40—40 of FIG. 39 detailing multiple cart loading positions.

FIGS. 38–40 illustrate another alternate embodiment of a tilting table 620 according to this invention. The table 620 includes a table top 622 that receives web 12 from an upstream conveyor 16 having a conveyor belt 20 of a form similar to that described hereinabove. In this embodiment, a flap 624 bridges a gap 626 between an upstream end of the table top support surface 622 and the conveyor 16. A flapless joint is also contemplated however. The table top includes a pivoting hold-down clamp bracket 628 having a top plate 630 that overlies a stack 632 that extends horizontally on the table top 622. The table top 622 is supported by a base 634 that enables pivoting of the table top 622 in two degrees of freedom as illustrated by the curved arrows 636 and 638. The base 634 further includes a lift piston 640 (FIG. 38) that enables raising and lowering of the table top 622 as shown by double arrow 642 (FIG. 37). In this embodiment, tilting of the table (curved arrow 638) is accomplished by a drive 644. However, manual tilting is also expressly contemplated. Lift of the table can be accomplished by a piston that responds to pneumatic or hydraulic pressure or, alternatively, by other linear drive mechanisms such as a rack and pinion system.

Similarly, as detailed in FIG. 38, the hold down bracket 628 is moved between an engaged position and a free position (shown in phantom) by a linear actuator 646 that can comprise a pneumatic piston or solenoid according to this embodiment.

The table top 622 of the table 620 further includes a moving backing support or door, 650 and 652, at each of the respective upstream and downstream ends of the table top 622. In this embodiment, the table top 622 rotates (curved arrow 636) about its base 634 so that either end of the table top 622 can be positioned adjacent the conveyor 16. Accordingly, the backing supports 650 and 652, according to this embodiment, are substantially similar in construction. Each backing support 650 and 652 extends upon demand through a respective slot 654 and 656. The upstream backing support 650 can be moved into and out of the path of travel of web 12 onto the table top 622. In an extended position, the downstream backing support 652 prevents further downstream movement of the stack 632 off the table. It can be positioned into the path of travel as shown in FIG. 37 while the stack 632 is formed. The upstream backing support 650, conversely, is located out of the path of travel of web 12 onto the table top 622 to enable formation of the stack 632. Once a stack 632 is formed on the table top, the table top 622 can be pivoted (curved arrow 638) so that one of the backing supports 650 or 652 engages and supports the bottom of the stack 632 in a substantially-vertical position. The respective backing support 650 or 652 can be moved out of position to locate the stack 632 on an adjacent cart in a manner described hereinabove. Note that the table top 622 can be tilted in either of two positions, thus allowing either end of the stack 632 to comprise the bottom end of a loaded stack on a cart. The ability to select either stack end as a bottom, facilitates further feeding of the stack 632 once it is positioned on a cart or on a subsequent device such as the dollies (ejectors) described hereinabove.

The drive 644 that controls tilting of the table, according to this or other embodiments herein, can be provided with a speed control having at least two speed settings so that initial tilting of the stack can occur at a high rate of speed, followed by a lower rate of speed as the table top 622 reaches its substantially-vertical orientation. Note that the pivoting hold down bracket 628 assists in maintaining the stack 632 on the table top as acceleration and deceleration of the drive 644 occurs.

In addition, it is contemplated that the table 620 or any of the other tilting table structures described herein can be tilted to an angle less than perpendicular relative to a floor surface. In such an orientation, web from a stack thereon can be fed to a remote location directly from the table while the stack is positioned at a desirable angle that insures that the end of the stack feeds freely and does not "flop" against the table top surface. To this end, feeding from a stack oriented such as that of the dolly 356 of FIG. 23 can be accomplished using the table 620 itself.

The table top support surface 622 according to this embodiment further includes upstream and downstream sensors 658 and 660, respectively. As described above, sensors can be provided to any of the table structures according to this invention, in order to indicate the presence, absence or movement of web therealong. The sensors can be utilized to control a deployment of the backing support 650 when, for example, the stack has moved onto the table top to a position downstream of the backing support slot 654 (allowing the backing support to be extended without disrupting the web). Similarly, the sensors can be utilized to automatically reset the table to a horizontal orientation when a stack has been off-loaded from the table top.

In addition, the backing plate 630 can be provided with adjustment screws 662 or other mechanisms that enable the backing plate 630 to be raised and lowered depending upon the width of sheets in the stack 632. Accordingly, the plate 630 includes slots 664 that enable raising and lowering of the plate 630 relative to the plate support bracket 666. When an appropriate plate height is set, the screws 662 are tightened to maintain the plate 630 at the selected height.

FIG. 39 illustrates an application in which the lift piston 640 is actuated to raise the table top 622, and accompanying stack 668, relative to the base 634. A cart 670, having shelves 672 of a type discussed hereinabove, is located adjacent the more downstream side of table 620. The table is positioned in a substantially-vertical orientation with the stack 668 supported by the downstream backing support 652. The hold-down bracket 628 has been deployed either automatically or manually into a free position for unloading of the stack 668. Note that the table top 622 could have been tilted in the opposite direction so that the upstream backing support 650 (in an extended position) supports an opposing end of the stack 668 on a more upstream side of the table top 622. The cart 670 would, in this instance, be located on a side of the table 620 opposite that illustrated in FIG. 39. Similarly, while a cart having shelves is illustrated, it is contemplated that the lift piston 640 can be utilized to locate additional stacks atop already loaded stacks in the cart without the intervention of shelves therebetween. The table top 622, in this instance, should be lifted so that the backing support 650 or 652 is positioned above the top of the already-loaded stack. Moving the backing support out of engagement with the bottom of the stack serves to place the stack onto the preceding, loaded, stack.

As further detailed in FIG. 40, the pivoting table top 622, according to this embodiment, can be rotated (curved arrow 636) so that the table top 622 faces each of at least four different directions, each at a right angle to the other. Hence, as shown, each of four quadrants of the cart 670 (shown at three other locations in phantom) is easily accessed for loading while the table top 622 is tilted into the substantially-vertical orientation.

While the base 634 herein is shown as a pedestal fixedly mounted to the floor surface 690, it is contemplated that a wider movable base can be utilized in this or other embodiments of the tilting table according to this invention. To wit, wheels can be provided to the base to enable it to be moved about. This facilitates use of the table as a feeding unit for remotely positioned utilization devices or as an independent stack transport unit, or to aid in accessing carts for unloading stacks thereonto.

Similarly, it is expressly contemplated that any of the tilting tables shown herein can include movable backing surfaces at either end thereof, and that these tables can tilt in either a clockwise or counterclockwise direction to unload stacks thereon from either an upstream side or a downstream side. Similarly, while specific embodiments including certain features have been shown for the sake of brevity, it is expressly contemplated that features such as driven or spring loaded backing surfaces that move with a forming stack can be provided to each of the embodiments. Movable hold-down brackets can be provided to any of the embodiments described herein. Powered drive components or, alternatively, manually operated components can be utilized in any of the above-identified embodiments. Each of the tables or conveyors can be provided with a bridging flap, or alternatively, relatively gapless spacing, between the conveyor and table top according to this invention. Each of the tables described herein can be adapted to rotate or lift relative to its base and each of the backing surfaces discussed herein can be provided with straps as described above to facilitate unloading of a stack onto a cart. Similarly, any of the carts described herein can be utilized in conjunction with any of the tables herein. Likewise, any of the tables can be adapted to support a web stack directly thereon, or alternatively, can be adapted to support a cart or cart section that is directly provided with a web stack from the conveyor. Finally, a variety of sensors can be provided to the conveyor or table according to this invention to automate some or all of the loading and unloading functions described herein.

In the foregoing description, reference has been made primarily to the use of the present invention as it pertains to business forms and in particular folded forms. However, the concepts of the present invention may also be employed in connection with the processing of cut sheets.

It is expressly contemplated that, while the terms "substantially-vertical orientation" and "substantially-horizontal orientation" are utilized to describe the relative positions of the tilting table, it should be understood that these terms are meant to include orientations that are at nonperpendicular and nonparallel alignments relative to a floor surface. In other words, the "substantially-horizontal position" is taken to include the disposition of the table top at an acute angle relative to the floor surface such as, for example, a downward slant taken in an upstream to downstream direction. Such a downward slant could, in fact, facilitate the passage of web onto the table in certain applications. In addition, the "substantially-vertical orientation" is taken to include angles that are nonperpendicular to the floor. For example, it can be desirable to orient the table top so that the stack is canted against the table top to ensure that it does not fall over during transfer onto the cart.

Finally, it is also expressly contemplated that the grooves and slots located in the bases of the respective carts disclosed herein need not include bottoms. Rather, the term "grooves" or "slots" should be taken to include through-cut slots that form notches at various locations in the base. In this instance, the fingers of a dolly need not be limited in thickness since they will have clearance to the floor surface.

The foregoing has been a detailed description of a preferred embodiment. Various modifications and equivalents can be made without departing from the spirit and scope of this invention. This description is, therefore, meant to be taken only by way of example and not to otherwise limit the scope of the invention.

What is claimed is:

1. A system for storing and transporting web material in the form of a stack comprising:

a cart including upright walls and a base, having wheels, defining at least one storage space in which the stack is supported by the base and extends upwardly along the walls; and a transport dolly for receiving the stack from the base of the cart, the transport dolly having wheels and including a stack-supporting section constructed and arranged to pass beneath a bottom of the stack when the stack rests on the base of the cart, wherein movement of the stack-supporting section relative to the base of the cart enables the stack to be lifted from the base by the underlying stack-supporting section for removal of the stack from the cart, wherein the transport dolly further includes a web guide located at an upper end thereof that enables passage of web thereover for feeding to a utilization device.

2. An apparatus as set forth in claim 1 wherein the stack supporting section comprises a plurality of fingers that interengage with a plurality of grooves in the base of the cart and wherein the grooves permit the fingers to pass under the bottom of the stack.

3. An apparatus as set form in claim 1 wherein the transport dolly includes a frame having a movable leg that enables the transport dolly to be located in a plurality of standing positions with a stack located thereon.

4. An apparatus as set forth in claim 1 wherein the transport dolly includes a frame having a backing surface for supporting the stack along an extended length thereof and wherein the frame includes a leg structure that enables the dolly to stand with the backing surface at an angle relative to a floor surface with the stack extending at an acute angle to the floor surface.

5. An apparatus as set forth in claim 1 wherein the web guide includes a brush that bears against a surface of the web to maintain a holding force on the web as it passes through the web guide.

6. An apparatus as set forth in claim 1 wherein the dolly includes an upwardly extending frame and the support structure is disposed at an acute, nonperpendicular, angle relative to the upwardly extending frame of the transport dolly so that the stack positioned thereon is biased against the upwardly extending frame.

7. An apparatus as set forth in claim 1 wherein the transport dolly includes a frame having a latch thereon and a leg having a frictional surface thereon for engaging a floor surface and wherein the transport dolly includes wheels, the frame being pivotable about the wheels to position the dolly at a plurality of positions relative to the floor and the latch being movable to position the frictional surface of the leg against the floor in at least one of the plurality of positions.

8. An apparatus as set forth in claim 1 wherein the upstanding walls define a plurality of storage locations for locating stacks upon the base of the cart.

9. An apparatus as set forth in claim 8 wherein the base of the cart includes a locking device for retaining the base laterally relative to the floor surface.

10. An apparatus as set forth in claim 9 wherein the locking device comprises a movable pin and a raised base structure mounted on the floor surface, the base structure having a well and the pin being movable to engage the well wherein lateral motion of the cart is restricted.

11. An apparatus as set forth in claim 10 wherein the locking device comprises an operating lever interconnected with the pin, the operating lever being movable between a position in which the pin engages the well and a position in which the pin is free of the well.

12. An apparatus as set forth in claim 9 wherein the base of the cart includes an upper base interconnected with the upstanding walls and a lower base interconnected with the wheels, and a bearing structure that enables the upper base to rotate relative to the lower base upon an axis that is substantially-perpendicular to the floor surface.

13. An apparatus as set forth in claim 1 wherein the base of the cart includes an upper base interconnected with the upstanding walls and a lower base interconnected with the wheels, and a bearing structure that enables the upper base to rotate relative to the lower base upon an axis that is substantially-perpendicular to the floor surface.

14. An apparatus as set forth in claim 1 wherein the cart includes a web guide located adjacent a top of each of the intersecting walls for directing web from the stack to a downstream location.

15. An apparatus as set forth in claim 14 wherein the web guide comprises a roller that engages the web.

16. An apparatus as set forth in claim 15 wherein the upstanding walls define a plurality of stack storage locations and wherein the web guide includes a bracket for supporting the roller, the bracket being positionable over each of the plurality of storage locations.

17. An apparatus as set forth in claim 16 wherein the upstanding walls define four storage locations, the walls intersecting at right angles to each other and wherein the bracket comprises an angled bracket having a pivot point at a center of a point of intersection of the walls, the bracket being rotatable about the pivot point to position the roller over an approximate midsection of each of the storage locations.

18. An apparatus as set forth in claim 15 further comprising a brush that bears against a side of the web opposite the roller.

19. An apparatus as set forth in claim 18 wherein the brush is pivotally mounted relative to the roller.

20. An apparatus as set forth in claim 1 wherein the intersecting walls define a single storage location and wherein the upstanding walls are constructed and arranged to mate in a side-by-side relationship with another cart having a pair of upstanding walls defining a least a single storage location so as to form a cart assembly having a plurality of storage locations.

21. An apparatus as set forth in claim 20 wherein each of the cart and the other cart include a plurality of wheels thereon so that each of the cart and the other cart are independently movable and can be moved in the interconnected relationship.

22. An apparatus as set forth in claim 21 wherein at least some of the wheels of the cart and the other cart comprise pivotal caster wheels.

23. An apparatus as set forth in claim 1 wherein the cart includes attachment locations constructed and arranged to receive opposing ends of hold-down straps that extend over the stack positioned in the storage location and that secure the stack within the storage location.

24. An apparatus as set forth in claim 23 wherein each at least one of the hold-down straps includes a hook and loop fastening material at one end thereof to enable adjustable fastening of the end to the attachment location.

25. An apparatus as set forth in claim 1 wherein the base of the cart includes a groove on a bottom side of the base facing a floor surface constructed and arranged to receive a tine of a pallet jack therein.

26. An apparatus as set forth in claim 1 wherein the cart includes handles thereon to enable grasping of the cart from movement thereof.

27. An apparatus as set forth in claim 1 further comprising a table having a table top for receiving a stack of web extending substantially-horizontally thereon, the table being movable into a substantially-vertical position wherein the stack is supported on a supporting surface that extends from the table top, the table top and the supporting surface being constructed and arranged so that the stack can be transferred to the base of the cart in the substantially-vertical position.

28. An apparatus as set forth in claim 27 further comprising a moving backing surface that retains a downstream end of the stack as web is conveyed onto the table top.

29. An apparatus as set forth in claim 27 wherein the table top is constructed and arranged to receive an upstanding wall of the cart thereon, wherein web is conveyed into the horizontal stack along the wall of the cart and wherein a downstream end of the stack is located adjacent the base of the cart.

30. An apparatus as set forth in claim 1 further comprising a channel-shaped support surface located between the base of the cart and a bottom of the stack, the support structure of the transport dolly being constructed and arranged to pass into a channel of the channel-shaped supporting surface so that each of the supporting surface and the stack can be removed from the base of the cart by transport dolly.

31. An apparatus as set forth in claim 30 further comprising a backing surface that moves along the table top to retain a downstream end of the stack is conveyed along the upstanding wall.

32. An apparatus as set forth in claim 31 wherein the backing surface includes a bracket that enables movement of the backing surface out of an interfering position relative to the wall so that the cart can be removed from the table top.

33. A system for storing and transporting web material in the form of a stack comprising:

a cart including upright walls and a base, having wheels, defining at least one storage space in which the stack is supported by the base and extends upwardly along the walls;

a transport dolly for receiving the stack from the base of the cart, the transport dolly having wheels and including a stack-supporting section constructed and arranged to pass beneath a bottom of the stack when the stack rests on the base of the cart, wherein movement of the stack-supporting section relative to the base of the cart enables the stack to be lifted from the base by the stack-supporting section for removal of the stack from the cart;

a table having a table top for receiving a stack of web extending substantially-horizontally thereon, the table being moveable into a substantially-vertical position wherein the stack is supported on a supporting surface that extends from the tabletop, the tabletop and the supporting surface being constructed and arranged so that the stack can be transferred to the base of the cart in the substantially-vertical position; and wherein the supporting surface comprises a moveable backing surface having a bracket that enables the backing surface to be positioned in and out of a path of travel of the web from a conveyer onto the table top.

* * * * *